US012761658B2

(12) United States Patent
Jang

(10) Patent No.: US 12,761,658 B2
(45) Date of Patent: Oct. 13, 2026

(54) ROBOT CAPABLE OF OBTAINING MAP INFORMATION BY USING ULTRA-WIDE BAND COMMUNICATION AND METHOD OF CONTROLLING THE ROBOT

(71) Applicant: KOOKMIN UNIVERSITY INDUSTRY ACADEMY COOPERATION FOUNDATION, Seoul (KR)

(72) Inventor: Byung-Jun Jang, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 8 days.

(21) Appl. No.: 18/947,437

(22) Filed: Nov. 14, 2024

(65) Prior Publication Data

US 2025/0321581 A1 Oct. 16, 2025

(30) Foreign Application Priority Data

Apr. 11, 2024 (KR) ........................ 10-2024-0048848
Jul. 1, 2024 (KR) ........................ 10-2024-0086319

(51) Int. Cl.
*G05D 1/226* (2024.01)
*G05D 1/242* (2024.01)
(Continued)

(52) U.S. Cl.
CPC ............. *G05D 1/242* (2024.01); *G05D 1/247* (2024.01); *G05D 1/622* (2024.01); *G05D 2111/32* (2024.01)

(58) Field of Classification Search
CPC ........ G05D 1/232; G05D 1/247; G05D 1/622; G05D 1/226; G05D 1/686; G05D 1/1113; H03Q 4/80; H03Q 4/029
See application file for complete search history.

(56) References Cited

U.S. PATENT DOCUMENTS

2007/0271011 A1 11/2007 Lee et al.
2016/0165795 A1* 6/2016 Balutis ................. G05D 1/0044 701/25
(Continued)

FOREIGN PATENT DOCUMENTS

CN 116652926 A 8/2023
EP 3787462 B1 1/2023
(Continued)

OTHER PUBLICATIONS

Bogyeong Kwon et al., "Implementation of High-speed Indoor Positioning System based on IEEE802.15.4z UWB", Proceedings of the Work-in-Progress Papers at the 13th International Conference on Indoor Positioning and Indoor Navigation (IPIN-WIP 2023), Sep. 25-28, 2023, pp. 1-10.
(Continued)

*Primary Examiner* — Tan Q Nguyen
(74) *Attorney, Agent, or Firm* — Sughrue Mion, PLLC

(57) ABSTRACT

A robot capable of obtaining map information by using ultra-wide band (UWB) communication includes an UWB transceiver, a plurality of UWB receivers, a memory, and a main processor. The main processor controls the UWB transceiver to transmit a UWB signal, controls, based on the UWB signal, each of the plurality of UWB receivers to generate a plurality of channel impulse responses (CIRs) and obtains map information of surroundings of the robot, based on respective characteristics of the plurality of channel impulse responses.

20 Claims, 28 Drawing Sheets

(51) Int. Cl.

| | |
|---|---|
| ***G05D 1/247*** | (2024.01) |
| ***G05D 1/622*** | (2024.01) |
| *G05D 111/30* | (2024.01) |
| *H04W 4/80* | (2018.01) |

(56) References Cited

U.S. PATENT DOCUMENTS

| | | | | |
|---|---|---|---|---|
| 2021/0397201 | A1* | 12/2021 | Kwak | G01S 5/0284 |
| 2022/0291374 | A1* | 9/2022 | Ryu | H01Q 23/00 |
| 2023/0194663 | A1* | 6/2023 | Zhang | G01S 7/41 701/49 |
| 2023/0254007 | A1* | 8/2023 | Tertinek | G01S 3/48 375/147 |
| 2023/0256612 | A1 | 8/2023 | Kang et al. | |
| 2024/0085511 | A1* | 3/2024 | Sinharoy | G05D 1/6482 |

FOREIGN PATENT DOCUMENTS

| | | | |
|---|---|---|---|
| KR | 1020070109748 | A | 11/2007 |
| KR | 10-2461220 | B9 | 11/2022 |

OTHER PUBLICATIONS

Communication dated Jan. 21, 2026 issued by the Korean Patent Office in application No. 10-2024-0086319.

* cited by examiner

ROBOT CAPABLE OF OBTAINING MAP INFORMATION BY USING ULTRA-WIDE BAND COMMUNICATION AND METHOD OF CONTROLLING THE ROBOT

CROSS-REFERENCE TO RELATED APPLICATION

This application is based on and claims priority under 35 U.S.C. § 119 to Korean Patent Application No. 10-2024-0048848, filed on Apr. 11, 2024, and Korean Patent Application No. 10-2024-0086319, filed on Jul. 1, 2024, in the Korean Intellectual Property Office, the disclosures of which are incorporated by reference herein in its entirety.

BACKGROUND

1. Field

One or more embodiments relate to a robot capable of obtaining map information by using ultra-wide band (UWB) communication and a method of controlling the robot. More particularly, one or more embodiments relate to a technology for applying UWB communication to robots to enables robots to transmit and receive information by using UWB communication, measure a distance and a direction, and detect a surrounding environment.

This research has been conducted with support from the Samsung Future Technology Promotion Project.

2. Description of the Related Art

Recently, robots that interact with an external environment have been widely used. For example, robots interacting with users, robots that follow users, and autonomous robots that deliver goods have been introduced in factories, shopping malls, restaurants, golf courses, orchards, and buildings.

Robots that interact with an external environment are required to detect a distance and a direction between a robot and an object in the external environment. At the same time, such robots are required to sense their surroundings and avoid obstacles if present. For example, a robot that delivers food in a restaurant is required to change a set trajectory or stop when an obstacle is encountered while traveling along the set trajectory to deliver food prepared in the kitchen to a table.

In the related art, a communication function and a detection function were implemented separately to implement functions, such as trajectory correction and collision avoidance, of robots interacting with an external environment. The communication function may be a function of establishing a communication connection between a robot and an external UWB transceiver (e.g., a UWB anchor). The detection function may be a function of measuring a distance from a robot to an external transceiver, detecting a direction from the robot toward the external transceiver, and determining the presence or absence of obstacles by recognizing a surrounding environment.

In the related art, the detection function was mostly implemented using Lidar scanners, laser scanners, a technology of recognizing obstacles by processing images obtained by cameras, or ultrasonic sensors. Because Lidar scanners or laser scanners are expensive devices, use of the Lidar scanners or the laser scanners increased the manufacturing costs of robots increase. When the technology of recognizing obstacles by processing images is applied to robots, complex image recognition algorithms are required, and when a robot follows a user, a user recognition rate, an accuracy of measured distances, and an accuracy of measured angles may decrease. When using ultrasonic sensors, a separate ultrasonic sensor may need to be installed on a robot to implement the detection function.

Under such circumstances, there is a growing need for robots capable of measuring a distance, detecting a direction, and detecting and avoiding obstacles or following a user by detecting a surrounding environment by simultaneously performing a communication function and a detection function by using UWB communication, even when there are no sensors such as Lidar scanners, laser scanners, or separate cameras or ultrasonic sensors. In other words, a need for robots capable of obtaining map information by using UWB communication is increasing.

SUMMARY

Additional aspects will be set forth in part in the description which follows and, in part, will be apparent from the description, or may be learned by practice of the presented embodiments of the disclosure.

According to an embodiment, a robot for obtaining map information by using ultra-wide band (UWB) communication may include an UWB transceiver, a plurality of UWB receivers, a memory, and a main processor. The main processor may control the UWB transceiver to transmit a UWB signal, control each of the plurality of UWB receivers to generate a plurality of channel impulse responses (CIRs), based on the UWB signal, and obtain map information of the surroundings of the robot, based on respective characteristics of the plurality of channel impulse responses.

According to an embodiment, a method of controlling a robot for obtaining map information by using UWB communication includes transmitting a UWB signal, wherein the transmitting is performed by a UWB transceiver, generating a plurality of channel impulse responses, based on the UWB signal, wherein the generating is performed by the plurality of UWB receivers, and obtaining map information of the surroundings of the robot, based on respective characteristics of the plurality of channel impulse responses.

BRIEF DESCRIPTION OF THE DRAWINGS

The above and other aspects, features, and advantages of certain embodiments of the inventive concept will be more apparent from the following description taken in conjunction with the accompanying drawings, in which.

DETAILED DESCRIPTION

Figure 1:
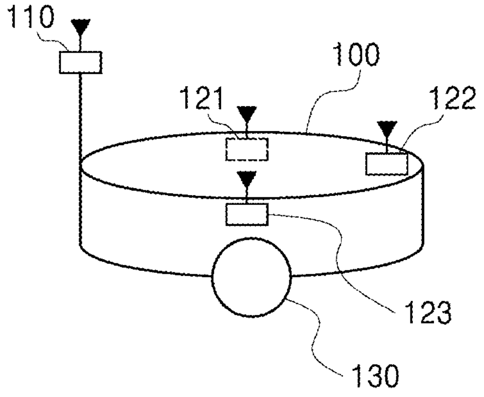
FIG. 1 is a drawing showing a robot that obtains map information by using ultra-wide band (UWB) communication, according to an embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The descriptions of embodiments below should not be construed as limiting the right scope of the accompanying claims, and it should be construed that all of the technical ideas included within the scope equivalent to the claims are included within the right scope of embodiments. Exemplary embodiments of the disclosure will now be described more fully with reference to the accompanying drawings.

Embodiments will now be described more fully with reference to the accompanying drawings. Like reference numerals in the drawings denote like elements, and, in the drawings, the sizes of elements may be exaggerated for clarity and for convenience of explanation. In this regard, the present embodiments may have different forms and should not be construed as being limited to the descriptions set forth herein.

When a layer is referred to as being "on" another layer or substrate, it can be directly on/below/on the left side of/on the right side of the other layer or substrate, or intervening layers may also be present. An expression used in the singular may encompass the expression of the plural, unless it has a clearly different meaning in the context. In addition, the terms "comprises" and/or "comprising" or "includes" and/or "including" when used in this specification, specify the presence of stated elements, but do not preclude the presence or addition of one or more other elements.

The use of the terms "a" and "an" and "the" and similar referents are to be construed to cover both the singular and the plural. The operations that constitute a method described herein can be performed in any suitable order unless otherwise indicated herein or otherwise clearly contradicted by context, but embodiments are not limited to the stated order.

The terms "unit", "-er (-or)", and "module" when used in this specification refers to a unit in which at least one function or operation is performed, and may be implemented as hardware, software, or a combination of hardware and software.

The connecting lines, or connectors shown in the various figures presented are intended to represent exemplary functional relationships and/or physical or logical couplings between the various elements. It should be noted that many alternative or additional functional relationships, physical connections or logical connections may be present in a practical device.

An expression, such as "at least one" preceding a list of elements, restricts the entire list of elements but does not individual elements within the list. For example, an expression such as "at least one of A, B, and C" or "at least one selected from the group consisting of A, B, and C" may be interpreted as A only, B only, C only, or any combination of two or more of A, B, and C, such as ABC, AB, BC, and AC.

When "about", "approximately", or "substantially" is used in connection with a numerical value, the numerical value may be interpreted as including a manufacturing or operating variance (e.g., ±10%) around the stated numerical value. When the terms "generally" and "substantially" are used in reference to geometric shapes, it is intended that no geometric precision is required and that latitude for shapes is within the scope of the present embodiment. Regardless of whether a numerical value or a shape is limited by "about", "approximately", or "substantially", the numerical value or the shape may be interpreted as including a manufacturing or operating variance (e.g., ±10%) around the stated numerical value.

While such terms as "first," "second," etc., may be used to describe various components, such components must not be limited to the above terms. The above terms are used only to distinguish one component from another.

The use of any and all examples, or exemplary language provided herein, is intended merely to better illuminate the inventive concept and does not pose a limitation on the scope of the present disclosure unless otherwise claimed.

Exemplary embodiments of the disclosure will now be described more fully with reference to the accompanying drawings.

FIG. 1 is a drawing showing a robot 100 that obtains map information by using ultra-wide band (UWB) communication, according to an embodiment.

The robot 100 according to an embodiment uses UWB communication technology. The robot 100 according to an embodiment may exchange information with an external UWB apparatus by transmitting an UWB signal. The robot 100 according to an embodiment may measure a distance and detect a direction with respect to the external UWB apparatus by transmitting an UWB signal. The robot 100 according to an embodiment may sense a surrounding environment of the robot 100. For example, the robot 100 according to an embodiment may sense a surrounding tomography of the robot 100. Accordingly, the robot 100 according to an embodiment may obtain map information of the surroundings of the robot 100 by using the UWB signal.

The robot 100 according to an embodiment may interact with an external environment. The robot 100 according to an embodiment may include a robot interacting with users, a robot that follow users, and an autonomous robot in factories, shopping malls, restaurants, golf courses, orchards, and buildings. For example, the robot 100 according to an embodiment may follow a golfer while holding a golf club on a golf course. For example, the robot 100 according to an embodiment may follow a farmer in an orchard. For example, the robot 100 according to an embodiment may deliver goods to a destination within a building. The robot 100 according to an embodiment may include an UWB transceiver 110, a plurality of UWB receivers 121, 122, and 123, namely, first, second, and third UWB receivers 121, 122, and 123, and a driving module 130.

The UWB transceiver 110 may be disposed over one side of the robot 100. For example, the UWB transceiver 110 may be disposed at the tip of an antenna of the robot 100. The antenna of the robot 100 may extend upward from one side of an upper surface of the robot 100. For example, the antenna of the robot 100 may extend upward from a rear end portion of the upper surface of the robot 100, based on a traveling direction of the robot 100.

The UWB transceiver 110 may transmit and receive the UWB signal. The UWB transceiver 110 may have an omni-directional radiation pattern. The antenna of the robot 100 may have an omni-directional radiation pattern. The UWB transceiver 110 may be named an UWB master or a UWB tag.

The plurality of UWB receivers 121, 122, and 123 may be arranged on a lateral surface or the upper surface of the robot 100. For example, the plurality of UWB receivers 121, 122, and 123 may be arranged on a left lateral surface of the robot 100, a front end portion of the upper surface of the robot 100, and a right lateral surface of the robot 100, based on the traveling direction of the robot 100. For example, the first UWB receiver 121 may be placed on the left lateral surface of the robot 100, the second UWB receiver 122 may be placed on the front end portion of the upper surface of the robot 100, and the third UWB receiver 123 may be placed on the right lateral surface of the robot 100. The plurality of UWB receivers 121, 122, and 123 of the robot 100 according to an embodiment may be included in three. However, embodiments are not limited thereto, and the plurality of UWB receivers 121, 122, and 123 may be provided in two or four or more.

The plurality of UWB receivers 121, 122, and 123 may receive a UWB signal. The plurality of UWB receivers 121, 122, and 123 may receive the UWB signal from the UWB transceiver 110. For example, the plurality of UWB receivers 121, 122, and 123 may receive the UWB signal directly from the UWB transceiver 110. For example, the plurality of UWB receivers 121, 122, and 123 may receive a UWB signal that is transmitted by the UWB transceiver 110, is reflected by a surrounding environment, and returns to the robot 100. The plurality of UWB receivers 121, 122, and 123 may have directional radiation pattern characteristics. The plurality of UWB receivers 121, 122, and 123 may be named UWB slaves.

Each of the plurality of UWB receivers 121, 122, and 123 may generate a plurality of channel impulse responses (CIRs), based on the UWB signal. The channel impulse response may be a response signal for an impulse signal of a wireless channel. Each of the plurality of UWB receivers 121, 122, and 123 may generate a channel impulse response for the received UWB signal. For example, the plurality of UWB receivers 121, 122, and 123 may generate a plurality of channel impulse responses by using the UWB signal that is reflected by the surrounding environment and returns to the robot 100.

The driving module 130 may be disposed on a lower surface of the robot 100 or in a lower portion of the lateral surface of the robot 100. The driving module 130 may drive the robot 100 to move. The driving module 130 may include a traveling module disposed in the traveling direction of the robot 100. For example, the driving module 130 may include wheels or caterpillars arranged in the traveling direction of the robot 100.

The robot 100 according to an embodiment may obtain the map information of the surroundings of the robot 100, based on respective characteristics of the plurality of channel impulse responses. For example, the respective characteristics of the plurality of channel impulse responses may include respective periods of the plurality of channel impulse responses, respective signal intensities of the plurality of channel impulse responses, and respective distances of the plurality of channel impulse responses. For example, the map information of the surroundings of the robot 100 may include tomographical information of the surroundings of the robot 100, information related to walls or obstacles around the robot 100, and information related to a user who the robot 100 wants to follow around the robot 100. Each of the plurality of channel impulse responses may include characteristics reflecting the map information of the surroundings of the robot 100. The robot 100 according to an embodiment may perform a simultaneous localization and mapping (SLAM) function of detecting the surrounding environment by using the UWB transceiver 100 and the plurality of UWB receivers 121, 122, and 123. For example, the robot 100 according to an embodiment may sense walls or obstacles around the robot 100 by performing the SLAM function.

The robot 100 according to an embodiment may obtain the map information by using UWB communication. The robot 100 according to an embodiment may perform the SLAM function by using UWB communication. Accordingly, the robot 100 according to an embodiment may measure a distance, detect a direction and detect and avoid obstacles or following a user by detecting a surrounding environment, even when there are no sensors such as Lidar scanners, laser scanners, or separate cameras or ultrasonic sensors. As a result, according to an embodiment, the manufacturing costs of the robot 100 may be reduced.

Figure 2:
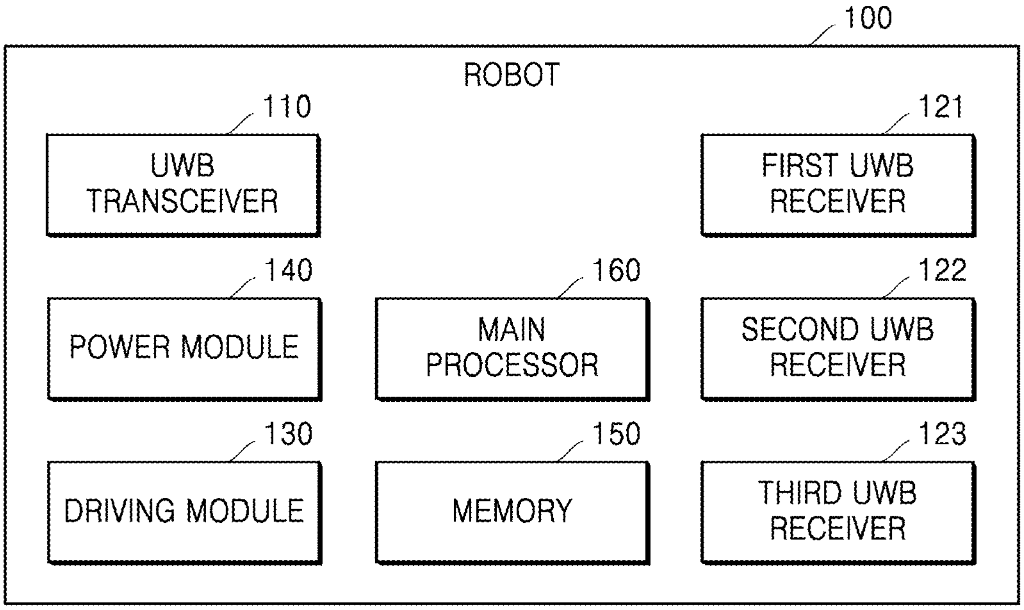
FIG. 2 is a block diagram of the robot according to an embodiment.

FIG. 2 is a block diagram of the robot 100 according to an embodiment. The robot 100 according to an embodiment may include the UWB transceiver 110, the plurality of UWB receivers 121, 122, and 123, namely, the first, second, and third UWB receivers 121, 122, and 123, the driving module 130, a power module 140, a memory 150, and a main processor 160.

The UWB transceiver 110 may transmit and receive the UWB signal. The UWB transceiver 110 may transmit and receive the UWB signal having an omni-directional radiation pattern. The UWB transceiver 110 may periodically transmit the UWB signal to the regions around the robot 100.

The plurality of UWB receivers 121, 122, and 123 may receive a UWB signal. The plurality of UWB receivers 121, 122, and 123 may receive a UWB signal that has a directional radiation pattern and is incident in a specific direction. The plurality of UWB receivers 121, 122, and 123 may receive the UWB signal from the UWB transceiver 110. The plurality of UWB receivers 121, 122, and 123 may receive the UWB signal transmitted by the UWB transceiver 110 and then reflected by the tomography of the surroundings of the robot 100. The plurality of UWB receivers 121, 122, and 123 may generate a plurality of channel impulse responses, based on the received UWB signal. The plurality of UWB receivers 121, 122, and 123 may transmit the generated plurality of channel impulse responses to the main processor 160.

The driving module 130 may provide mobility to the robot 100. The driving module 130 may drive the robot 100 to move.

The power module 140 may supply energy to the driving module 130. The power module 140 may supply energy to the driving module 130 so that the driving module 130 operates to move the robot 100 or rotates.

The memory 150 may store information necessary for driving the robot 100. The memory 150 may store information associated with an external environment sensed by the robot 100.

The main processor 160 may control overall operations of the robot 100. The main processor 160 may control at least one of the UWB transceiver 110, the plurality of UWB receivers 121, 122, and 123, the driving module 130, the power module 140, and the memory 150.

The main processor 160 may control the UWB transceiver 110 to transmit the UWB signal. The main processor 160 may transmit a control signal to the UWB transceiver 110 so that the UWB transceiver 110 transmits the UWB signal.

The main processor 160 may control each of the plurality of UWB receivers 121, 122, and 123 to generate the plurality of channel impulse responses, based on the UWB signal. The main processor 160 may control each of the plurality of UWB receivers 121, 122, and 123 to generate the plurality of channel impulse responses when each of the plurality of UWB receivers 121, 122, and 123 receives the UWB signal. The main processor 160 may control each of the plurality of UWB receivers 121, 122, and 123 to transmit the plurality of channel impulse responses respectively generated by the plurality of UWB receivers 121, 122, and 123 to the main processor 160. The main processor 160 may receive the plurality of channel impulse responses from the plurality of UWB receivers 121, 122, and 123, respectively.

The main processor 160 may obtain the map information of the surroundings of the robot 100, based on respective characteristics of the plurality of channel impulse responses. The respective characteristics of the plurality of channel impulse responses may include respective periods of the plurality of channel impulse responses, respective signal intensities of the plurality of channel impulse responses, and respective distances of the plurality of channel impulse responses. The map information of the surroundings of the robot 100 may include tomographical information of the surroundings of the robot 100, information related to walls or obstacles around the robot 100, and information related to a user who the robot 100 wants to follow around the robot 100. Each of the plurality of channel impulse responses may include characteristics associated with the map information of the surroundings of the robot 100. The main processor 160 may receive the respective characteristics of the plurality of channel impulse responses from the plurality of UWB receivers 121, 122, and 123, respectively. The main processor 160 may obtain the map information of the surroundings of the robot 100, based on the obtained respective characteristics of the plurality of channel impulse responses.

Figure 3:
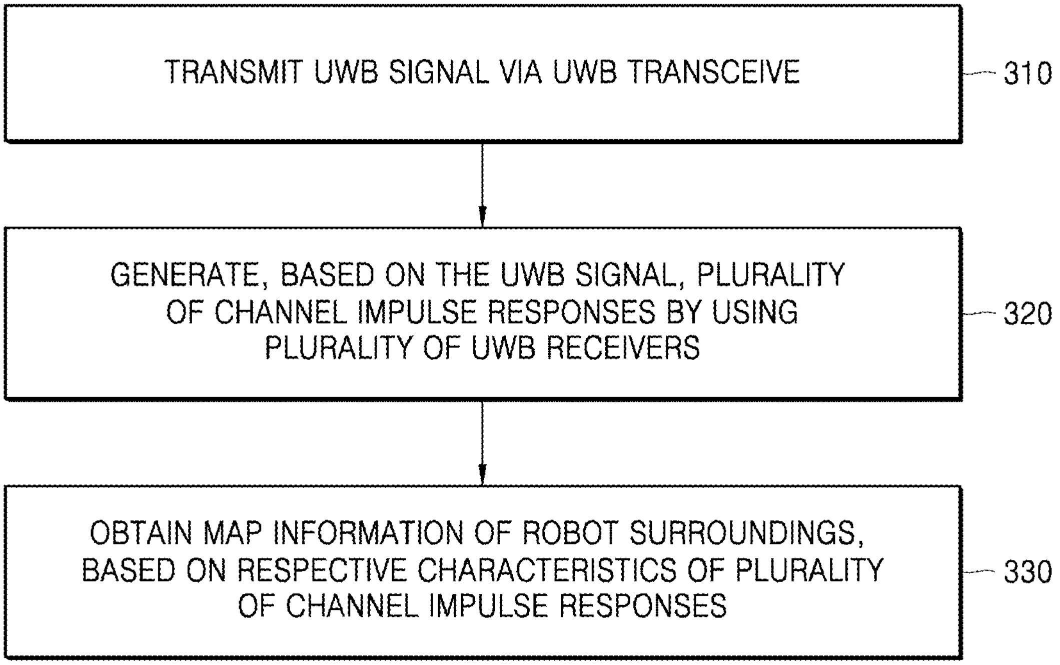
FIG. 3 is a flowchart of a controlling method of the robot that obtains the map information by using UWB communication, according to an embodiment.

FIG. 3 is a flowchart of a method of controlling the robot 100 that obtains map information by using UWB communication, according to an embodiment.

In operation 310, the robot 100 according to an embodiment may transmit a UWB signal via the UWB transceiver 110. The UWB transceiver 110 may be disposed at an upper rear or upper center of the robot 100. The UWB transceiver 110 may include a UWB SLAM master. The UWB transceiver 110 may transmit a UWB packet.

In operation 320, the robot 100 according to an embodiment may generate a plurality of channel impulse responses by using the plurality of UWB receivers 121, 122, and 123, based on the UWB signal. Each of the plurality of UWB receivers 121, 122, and 123 may receive the UWB signal directly from the UWB transceiver 110. Each of the plurality of UWB receivers 121, 122, and 123 may receive the UWB signal that is transmitted by the UWB transceiver 110 and reflected by a surrounding environment. The plurality of UWB receivers 121, 122, and 123 may generate a plurality of channel impulse responses, respectively, by analyzing the received UWB signal.

In operation 330, the robot 100 according to an embodiment may obtain the map information of the surroundings of the robot 100, based on respective characteristics of the plurality of channel impulse responses. The robot 100 may obtain the respective characteristics of the plurality of channel impulse responses respectively generated by the plurality of UWB receivers 121, 122, and 123. The respective characteristics of the plurality of channel impulse responses may include respective periods of the plurality of channel impulse responses, respective signal intensities of the plurality of channel impulse responses, and respective distances of the plurality of channel impulse responses. The robot 100 may obtain the map information of the surroundings of the robot 100 by analyzing the respective characteristics of the plurality of channel impulse responses. The map information of the surroundings of the robot 100 may include topographical information of the surroundings of the robot 100, information related to walls or obstacles around the robot 100, and information related to a user who the robot 100 wants to follow around the robot 100.

Figure 4:
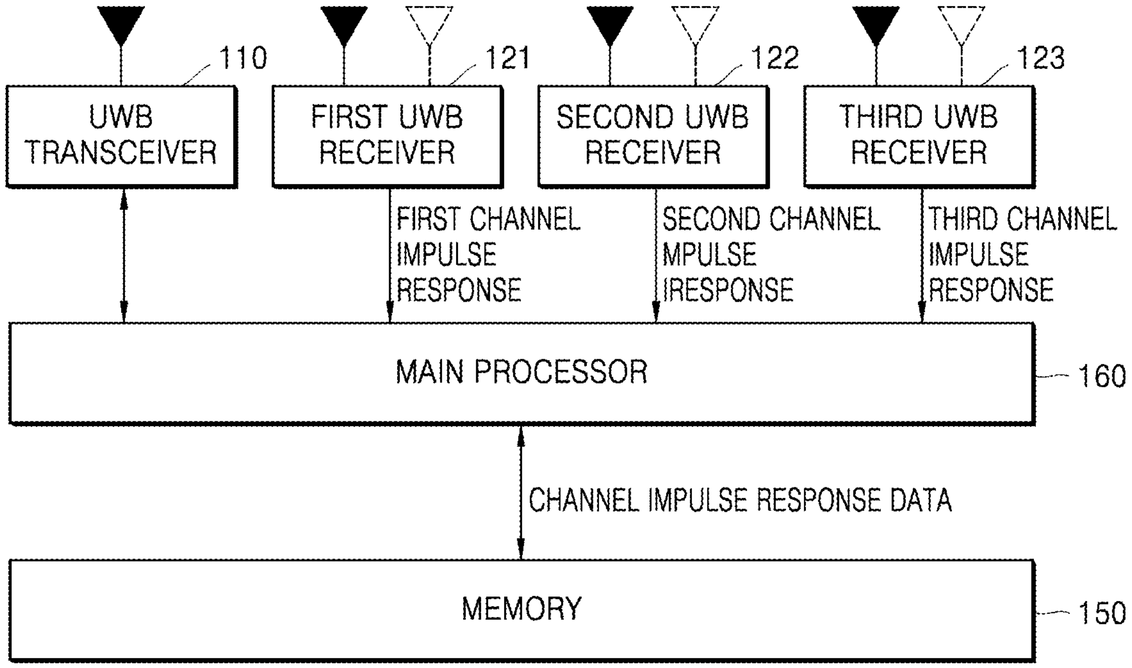
FIG. 4 is a diagram showing transmission of a channel impulse response (CIR) by the robot according to an embodiment.

FIG. 4 is a diagram showing transmission of a channel impulse response according to an embodiment.

The UWB transceiver 110 may periodically transmit a UWB signal under a control by the main processor 160. The UWB signal may include a blink message.

The first UWB receiver 121 may be directed toward the left lateral surface of the robot 100, based on the traveling direction of the robot 100. The first UWB receiver 121 may identify radio wave characteristics of the left lateral surface of the robot 100. The first UWB receiver 121 may receive a UWB signal incident from the left lateral surface of the robot 100 toward the robot 100. The first UWB receiver 121 may generate a first channel impulse response, based on the UWB signal. The first UWB receiver 121 may transmit the first channel impulse response to the main processor 160.

The second UWB receiver 122 may be directed toward a front surface of the robot 100, based on the traveling direction of the robot 100. The second UWB receiver 122 may identify radio wave characteristics of the front surface of the robot 100. The second UWB receiver 122 may receive a UWB signal incident from the front surface of the robot 100 toward the robot 100. The second UWB receiver 122 may generate a second channel impulse response, based on the UWB signal. The second UWB receiver 122 may transmit the second channel impulse response to the main processor 160.

The third UWB receiver 123 may be directed toward the right lateral surface of the robot 100, based on the traveling direction of the robot 100. The third UWB receiver 123 may identify radio wave characteristics of the right lateral surface of the robot 100. The third UWB receiver 123 may receive a UWB signal incident from the right lateral surface of the robot 100 toward the robot 100. The third UWB receiver 123 may generate a third channel impulse response, based on the UWB signal. The third UWB receiver 123 may transmit the third channel impulse response to the main processor 160.

The main processor 160 may receive the first channel impulse response, the second channel impulse response, and the third channel impulse response. The main processor 160 may obtain receive channel impulse response data including the first channel impulse response, the second channel impulse response, and the third channel impulse response. The main processor 160 may transmit the channel impulse response data to the memory 150.

The memory 150 may receive the channel impulse response data from the main processor 160. The memory 150 may receive channel impulse response data based on each of the plurality of channel impulse responses from the main processor 160. The memory 150 may store the channel impulse response data. The memory 150 may transmit the stored channel impulse response data to the memory 160. The memory 150 may transmit the pre-stored channel impulse response data to the main processor 160.

The main processor 160 may obtain the map information of the surroundings of the robot 100, based on at least one of the received first channel impulse response, the received second channel impulse response, the received third channel impulse response, and the channel impulse response data stored in the memory 150. For example, the main processor 160 may construct the map of an area where the robot 100 operates, based on at least one of the received first channel impulse response, the received second channel impulse response, the received third channel impulse response, and the channel impulse response data stored in the memory 150. For example, the main processor 160 may detect people or obstacles around the robot 100, based on at least one of the received first channel impulse response, the received second channel impulse response, the received third channel impulse response, and the channel impulse response data stored in the memory 150.

Figure 5:
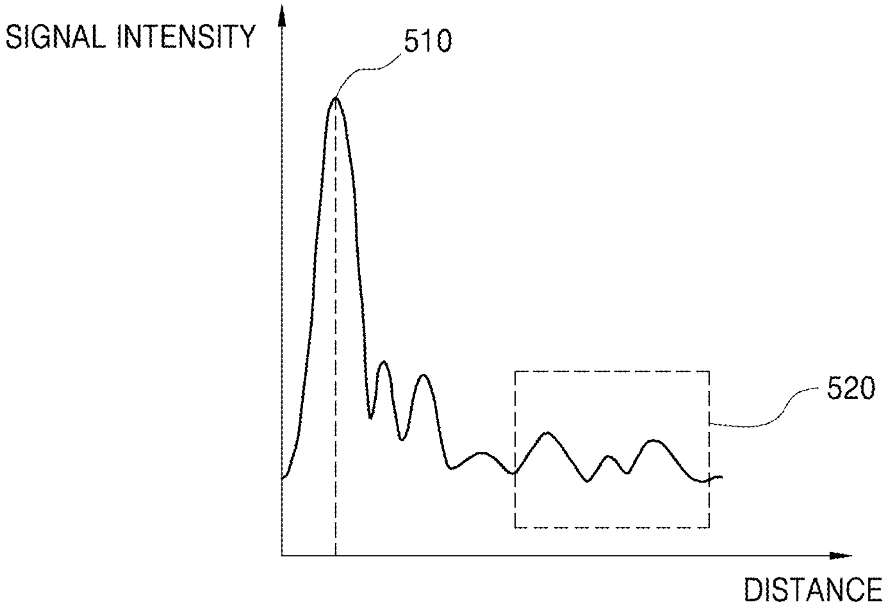
FIG. 5 is a graph showing a channel impulse response of the robot according to an embodiment.

FIG. 5 is a graph showing a channel impulse response of the robot 100 according to an embodiment.

The channel impulse response may vary according to a distance between the robot 100 and a location where the UWB signal is generated. FIG. 5 is a graph showing the signal intensity of a channel impulse response according to the distance between the robot 100 and the location where the UWB signal is generated.

The channel impulse response may include a line of sight (LoS). The channel impulse response may have a maximum signal intensity 510 when the distance between the robot 100 and the location where the UWB signal is generated is a designated reference distance. The maximum signal intensity 510 may be the peak of an LoS. Because a distance between the UWB transceiver 110 and the first UWB receiver 121 is fixed, the location of a first peak of the channel impulse response may always be constant. Respective characteristics of the plurality of channel impulse responses obtained by the robot 100 may include LoSs.

The channel impulse response may gradually slightly change compared to the maximum signal intensity 510 when the distance between the robot 100 and the location where the UWB signal is generated increases beyond the designated reference distance. The channel impulse response may irregularly have a plurality of peaks while gradually slightly varying compared to the maximum signal intensity 510. The plurality of peaks of the channel impulse response may be a phenomenon caused due to bottom reflection.

The channel impulse response may include surrounding environment information induced from a non-line of sight (NLoS). The channel impulse response may have a plurality of NLoSs 520 when the distance between the robot 100 and the location where the UWB signal is generated increases beyond the designated reference distance. The plurality of NLoSs 520 may include environmental information of the surroundings of the robot 100. The respective characteristics of the plurality of channel impulse responses obtained by the robot 100 may include the surrounding environment information induced from NLoS. For example, peaks that appear from the maximum signal intensity 510, which is a first peak, may correspond to a signal that is reflected by walls or obstacles existing in a direction in which anchors are directed and is incident on the robot 100.

The channel impulse response may include surrounding environment information induced from LoSs and NLoSs. The respective characteristics of the plurality of channel impulse responses may include the surrounding environment information induced from LoSs and NLoSs. The robot 100 may identify the radio wave characteristics of the directions in which the plurality of UWB receivers 121, 122, and 123 are directed, respectively, by using the omnidirectionality of each of the plurality of UWB receivers 121, 122, and 123.

Figure 6:
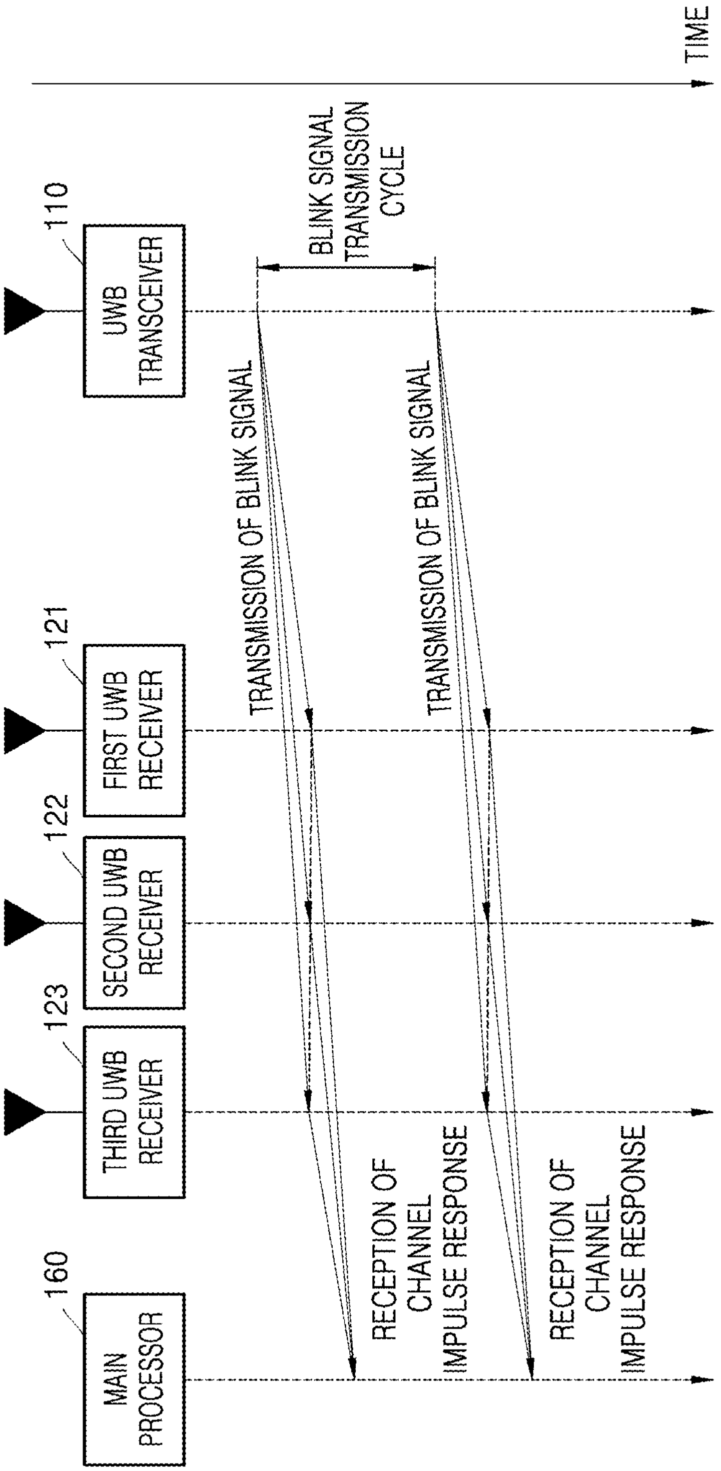
FIG. 6 is a diagram showing transmission of a blink signal by the robot according to an embodiment.

FIG. 6 is a diagram showing transmission of a blink signal by the robot 100, according to an embodiment.

The UWB transceiver 110 may periodically transmit a blink signal to transmit the UWB signal. The blink signal may be a signal included in the UWB signal. The blink signal may include a blink message. The blink signal may be transmitted to the first UWB receiver 121, the second UWB receiver 122, and the third UWB receiver 123 during each blink signal transmission period. For example, the blink signal transmission period may be about 0.1 seconds.

The first UWB receiver 121 may receive a blink signal transmitted by the UWB transceiver 110. The second UWB receiver 122 may receive a blink signal transmitted by the UWB transceiver 110. The third UWB receiver 123 may receive a blink signal transmitted by the UWB transceiver 110. The first UWB receiver 121, the second UWB receiver 122, and the third UWB receiver 123 may receive blink signals at the same time.

The first UWB receiver 121 may generate a channel impulse response, based on the received blink signal. The second UWB receiver 122 may generate a channel impulse response, based on the received blink signal. The third UWB receiver 123 may generate a channel impulse response, based on the received blink signal. The first UWB receiver 121, the second UWB receiver 122, and the third UWB receiver 123 may transmit channel impulse responses to the main processor 160. For example, the first UWB receiver 121, the second UWB receiver 122, and the third UWB receiver 123 may transmit channel impulse responses to the main processor 160 by using a universal asynchronous receiver transmitter (UART) communication method. For example, the first UWB receiver 121, the second UWB receiver 122, and the third UWB receiver 123 may transmit the channel impulse responses to the main processor 160 by using a serial peripheral interface (SPI) communication method.

The main processor 160 may receive the channel impulse responses from the first UWB receiver 121, the second UWB receiver 122, and the third UWB receiver 123. The main processor 160 may obtain the map information of the surroundings of the robot 100, based on the channel impulse responses.

Figure 7:
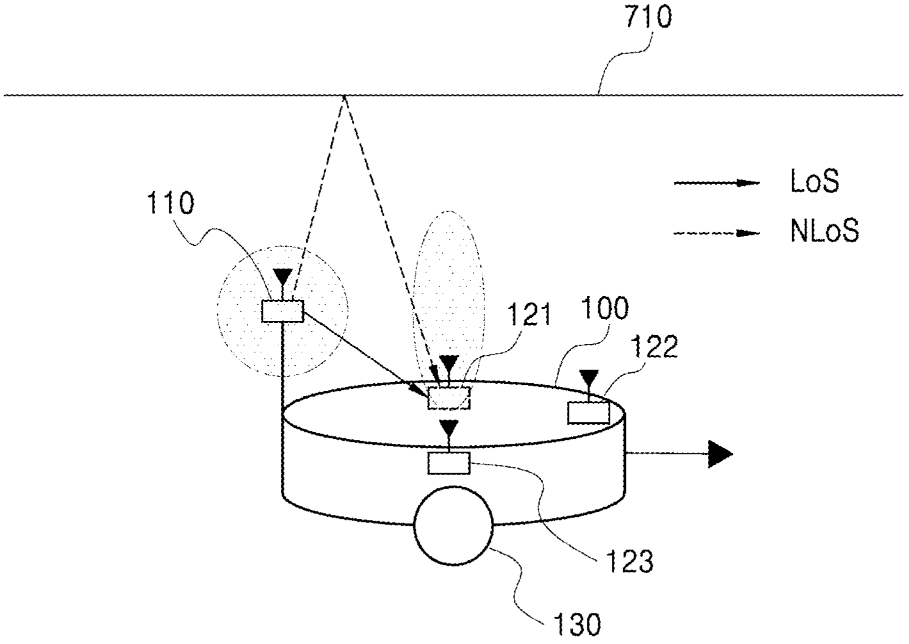
FIG. 7 is a diagram showing detection of a wall by the robot according to an embodiment.

FIG. 7 is a diagram showing detection of a wall 710 by the robot 100, according to an embodiment.

The wall 710 may be located on the left side of the robot 100, based on the traveling direction of the robot 100. The UWB signal transmitted by the UWB transceiver 110 may be directly transmitted to the first UWB receiver 121 disposed on the left side of the robot 100. The UWB signal transmitted from the UWB transceiver 110 directly to the first UWB receiver 121 may be an LoS. The UWB signal transmitted by the UWB transceiver 110 may be reflected by the wall 710 and then transmitted to the first UWB receiver 121 disposed on the left side of the robot 100. The UWB signal transmitted by the UWB transceiver 110, reflected by the wall 710, and then transmitted to the first UWB receiver 121 may be an NLoS.

Figure 8:
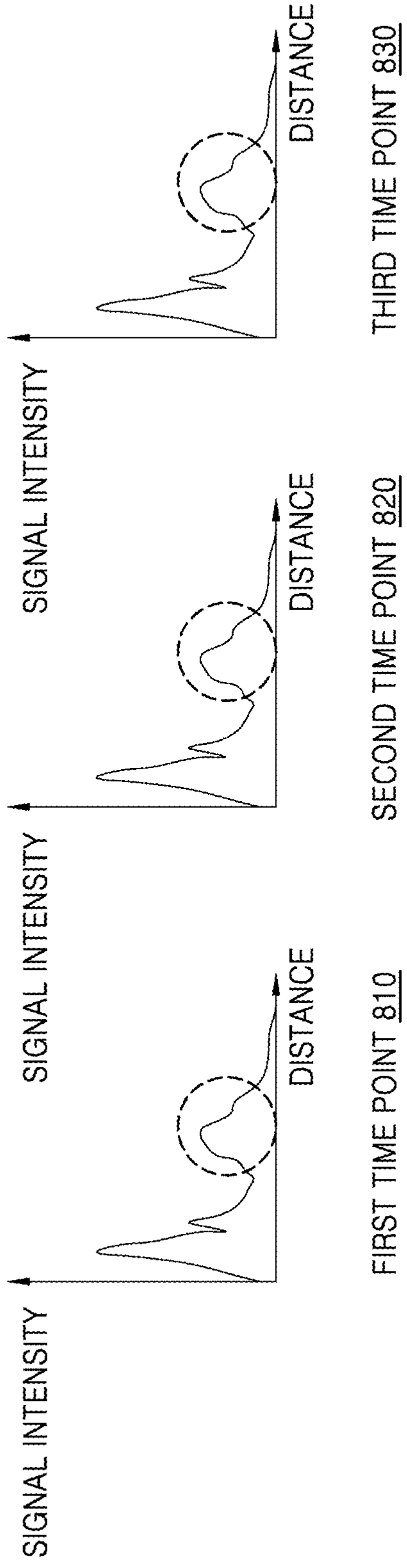
FIG. 8 is graphs showing channel impulse responses that are received when the robot detects a wall, according to an embodiment.

FIG. 8 is graphs showing channel impulse responses that are received when the robot 100 detects the wall 710, according to an embodiment.

Signal intensities of reflected waves of the channel impulse responses according to distances at a first time point 810, a second time point 820, and a third time point 830 may be constant. Signal periods of the reflected waves of the channel impulse responses at the first time point 810, the second time point 820, and the third time point 830 may be constant.

The main processor 160 of the robot 100 may determine that the wall 710 exists in a first direction when the signal intensity and signal period of the reflected wave of the first channel impulse response generated by the first UWB receiver 121 directed in the first direction among the plurality of UWB receivers 121, 122, and 123 remain constant. When the robot 100 moves at a constant speed and the wall 710 exists on the left side of the robot 100, a distance at which the UWB signal transmitted by the UWB transceiver 110 is reflected by the wall 710 may be constant. When the robot 100 moves at a constant speed and the wall 710 exists on the left side of the robot 100, a peak location of the reflected wave of the channel impulse response representing that the UWB signal is reflected may be constant. The main processor 160 may identify the presence of the wall 710 when the signal intensity and signal period of the reflected wave of the channel impulse response are kept constant. Accordingly, the main processor 160 may control the robot 100 to run at a certain distance from the wall 710.

Figure 9:
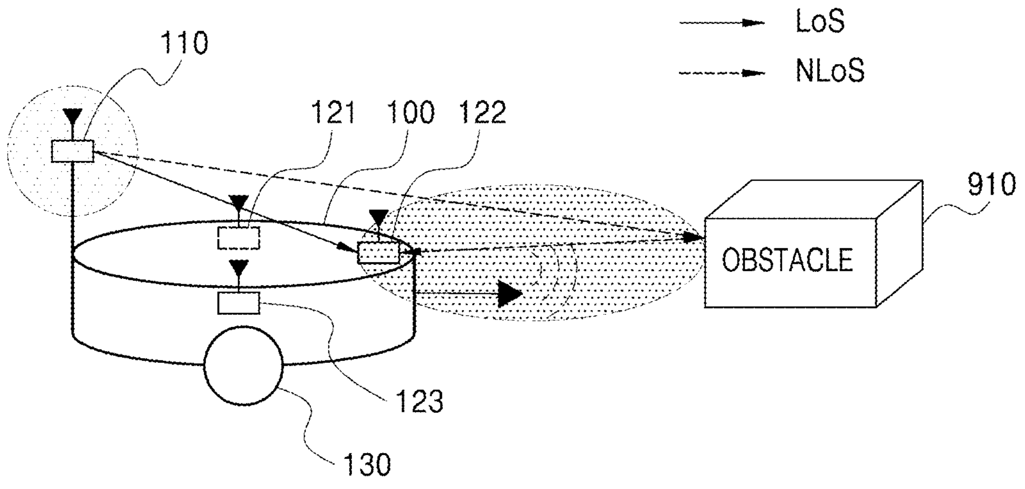
FIG. 9 is a diagram showing detection of an obstacle by the robot according to an embodiment.

FIG. 9 is a diagram showing detection of an obstacle 910 by the robot 100, according to an embodiment.

The obstacle 910 may be located on the front surface of the robot 100, based on the traveling direction of the robot 100. The UWB signal transmitted by the UWB transceiver 110 may be directly transmitted to the first UWB receiver 122 disposed on the front surface of the robot 100. The UWB signal transmitted from the UWB transceiver 110 directly to the second UWB receiver 122 may be an LoS. The UWB signal transmitted by the UWB transceiver 110 may be reflected by the obstacle 910 and then transmitted to the second UWB receiver 122 disposed on the front surface of the robot 100. The UWB signal transmitted by the UWB transceiver 110, reflected by the obstacle 910, and then transmitted to the second UWB receiver 122 may be an NLoS.

Figure 10:
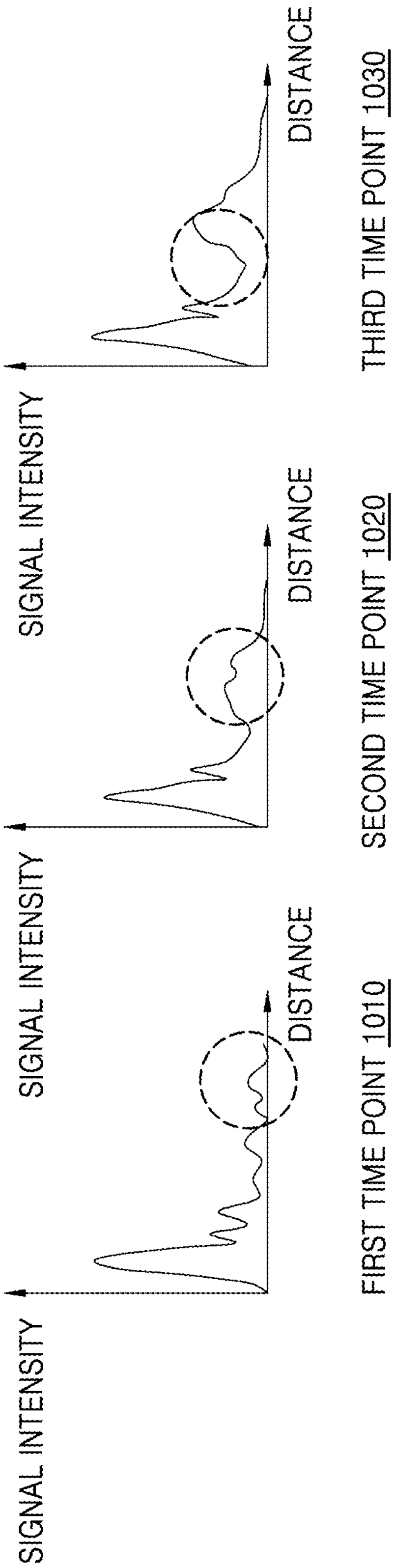
FIG. 10 shows graphs of channel impulse responses received when the robot detects an obstacle, according to an embodiment.

FIG. 10 is graphs showing channel impulse responses that are received when the robot 100 detects the obstacle 910, according to an embodiment.

Signal intensities of reflected waves of the channel impulse responses according to distances at a first time point 1010, a second time point 1020, and a third time point 1030 may vary. For example, compared to the signal intensity of the reflected wave of the channel impulse response at the first time point 1010, the signal intensity of the reflected wave of the channel impulse response at the second time point 1020 may increase. For example, compared to the signal intensity of the reflected wave of the channel impulse response at the second time point 1020, the signal intensity of the reflected wave of the channel impulse response at the third time point 1030 may increase.

Signal periods of the reflected waves of the channel impulse responses at the first time point 1010, the second time point 1020, and the third time point 1030 may vary. For example, compared to the signal period of the reflected wave of the channel impulse response at the first time point 1010, the signal period of the reflected wave of the channel impulse response at the second time point 1020 may decrease. For example, compared to the signal period of the reflected wave of the channel impulse response at the second time point 1020, the signal period of the reflected wave of the channel impulse response at the third time point 1030 may decrease.

The main processor 160 of the robot 100 may determine that the obstacle 910 exists in a second direction when at least one of the signal intensity or signal period of the reflected wave of the second channel impulse response generated by the second UWB receiver 122 directed in the second direction among the plurality of UWB receivers 122, 122, and 123 varies. When there is the obstacle 910 around the robot 100, a point where a peak occurs in a channel impulse response may change due to the obstacle 910. For example, when there is the obstacle 910 on the front surface of the robot 100, a time point where a peak occurs in a channel impulse response may be gradually advanced due to the obstacle 910. When the time point where a peak occurs in a channel impulse response is advanced, the main processor 160 may identify that the robot 100 gradually approaches the obstacle 910. For example, when there is the obstacle 910 on the rear surface of the robot 100, the time point where a peak occurs in a channel impulse response may be gradually delayed due to the obstacle 910. When the time point where a peak occurs in a channel impulse response is delayed, the main processor 160 may identify that the robot 100 moves away from the obstacle 910. Accordingly, the main processor 160 may identify the shape of the tomography of the surroundings while driving the robot 100.

Figure 11A:
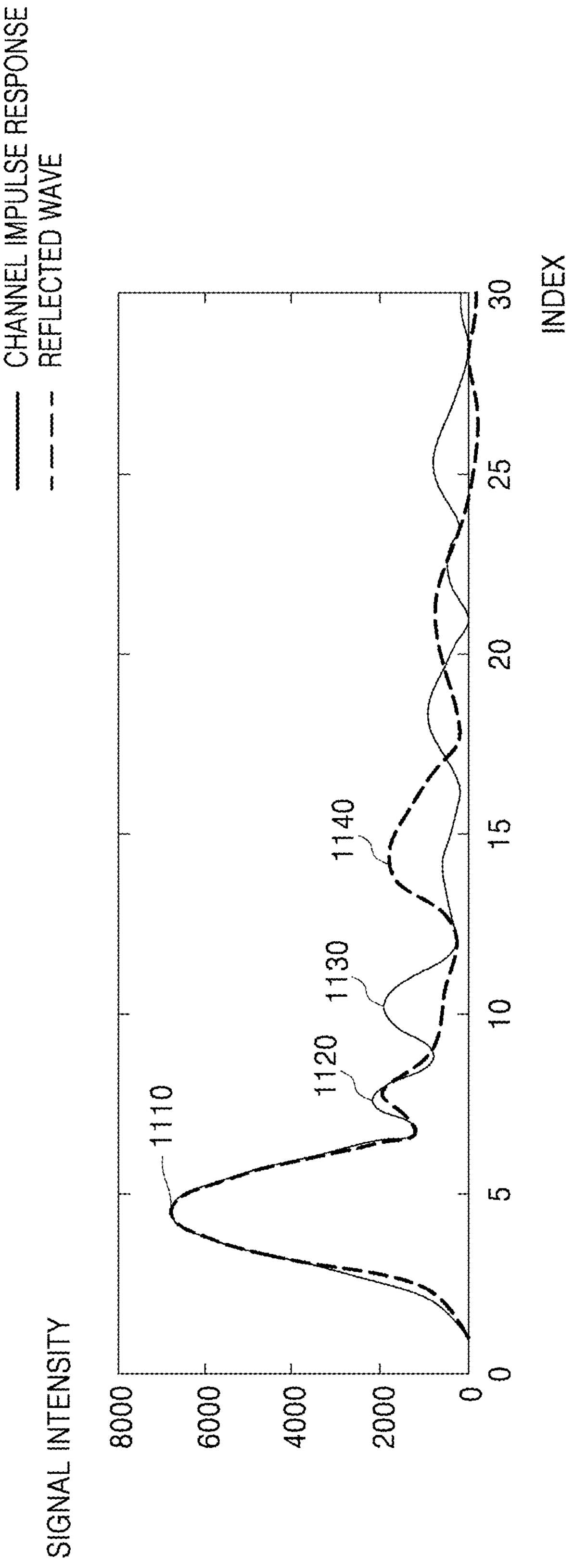
FIG. 11A shows a graph of a channel impulse response and a reflected wave of the robot according to an embodiment.

FIG. 11A is a graph showing a channel impulse response and a reflected wave of the robot 100 according to an embodiment.

The robot 100 may obtain the map information of the surroundings of the robot 100 by the channel impulse response and the reflected wave. The channel impulse response and the reflected wave may have maximum signal intensities at a LoS peak point 1110. The channel impulse response and the reflected wave may have different characteristics after the LoS peak point 1110. For example, the channel impulse response and the reflected wave may have different peak points and different peak intensities at a robot body reflection point 1120. For example, the channel impulse response may have a first reflection point 1130, and the reflected wave may have a second reflection point 1140.

The robot 100 may obtain the map information by detecting that a channel impulse response after a specified index is generated by a reflected wave. For example, the robot 100 may identify a location of the obstacle 910 by using a change in location of the reflected wave according to the specified index.

Figure 11B:
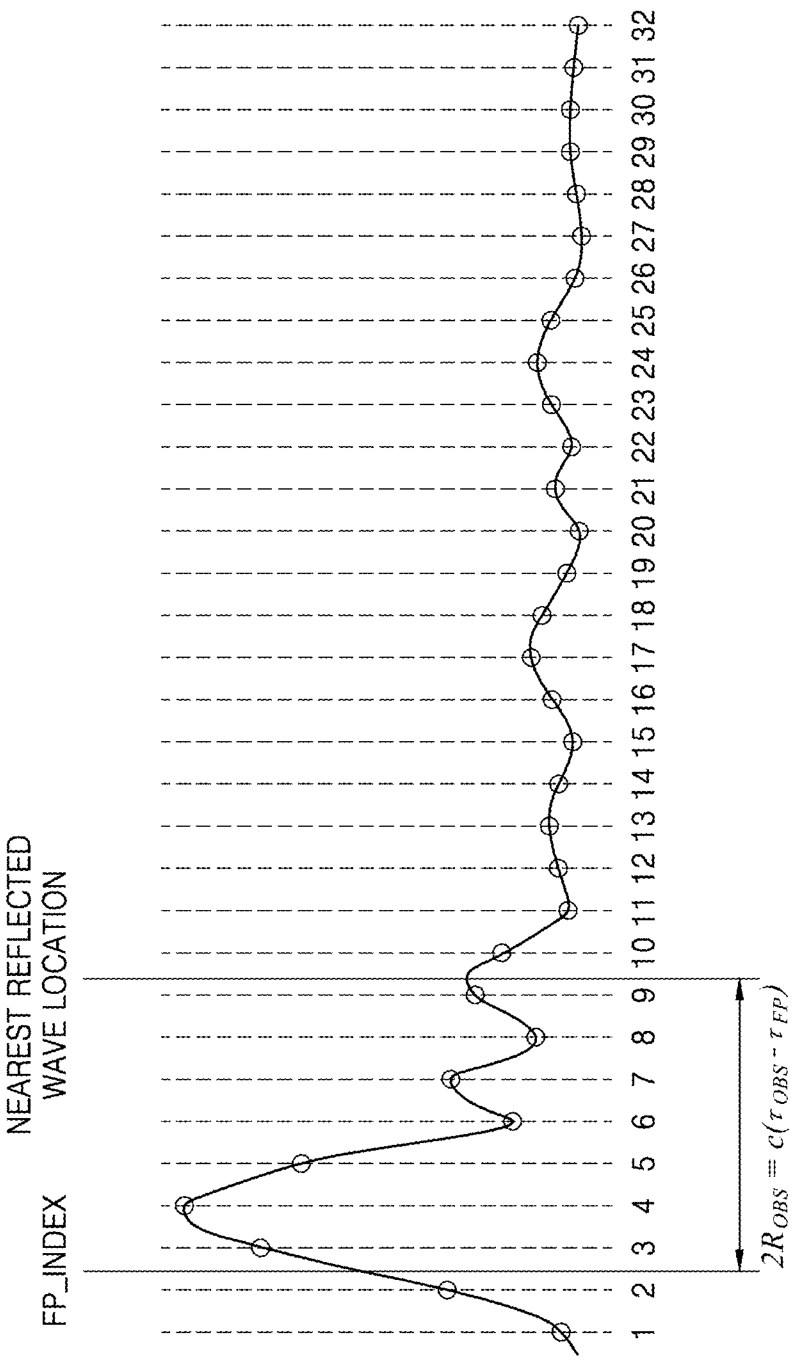
FIG. 11B is a diagram showing obtaining information by sensing the surroundings by the robot, according to an embodiment.

FIG. 11B is a diagram showing obtainment of information by sensing the surroundings by the robot 100, according to an embodiment.

The robot 100 according to an embodiment may obtain a channel impulse response and transmit the obtained channel impulse response to the main processor 160. Information contents of the channel impulse response may be included when the channel impulse response is transmitted in a UWB SLAM function. When sending the channel impulse response, the robot 100 may use 32 or 64 samples behind an index value FP_INDEX by including two samples before the index value FP_INDEX.

The robot 100 according to an embodiment may transmit information obtained by sensing the surroundings to the main processor 160 by including the information in the channel impulse response. The robot 100 may transmit the information obtained by sensing the surroundings to the main processor 160 by using the index value FP_INDEX included in the channel impulse response. The robot 100 may utilize 32 or 64 data units by including two samples before the index value FP_INDEX. The robot 100 may calculate a real part I and an imaginary part Q by directly using channel impulse response data. The robot 100 may calculate and transmit a size ($\sqrt{I^2+Q^2}$) of a combination of a real part and an imaginary part of the channel impulse response data without dividing the channel impulse response data into the real part and the imaginary part. The robot 100 may also calculate and transmit a distance to a nearest obstacle by processing the channel impulse response.

Twice a distance ($R_{OBS}$) from the robot 100 to an obstacle is equal to a value obtained by multiplying a difference ($\tau_{OBS}-\tau_{FP}$) between an index time ($\tau_{FP}$) and an obstacle delay time ($\tau_{OBS}$) by a light speed (c). The robot 100 may use this relationship to calculate a delay distance between the index value FP_INDEX and a nearest reflected wave location.

Figure 11C:
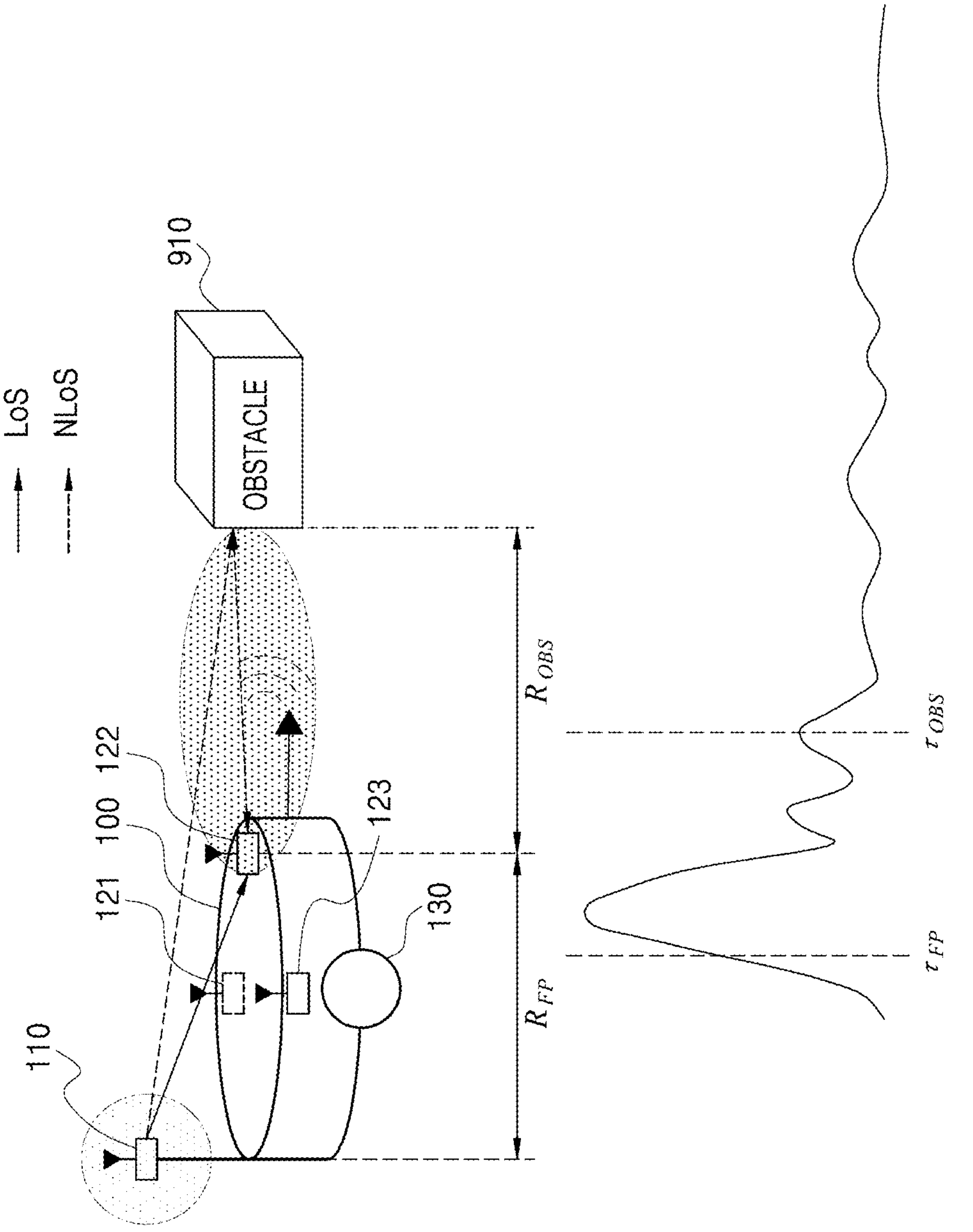
FIG. 11C is a diagram showing obtaining information by sensing the surroundings by the robot, according to an embodiment.

FIG. 11C is a diagram showing obtainment of information by sensing the surroundings by the robot 100, according to an embodiment.

The robot 100 according to an embodiment may transmit processed information other than the channel impulse response to the main processor 160. The robot 100 may extract distance information regarding a distance to an obstacle around the robot 100 instead of transmitting the channel impulse response. The robot 100 may transmit the extracted distance information regarding the distance to the obstacle around the robot 100 to the main processor 160. The robot 100 may calculate distance values, based on two time delays when transmitting the distance information to the main processor 160. Distance values based on time delay may include an index time ($\tau_{FP}$) and an obstacle delay time ($\tau_{OBS}$).

The index time ($\tau_{FP}$) may be a time delay corresponding to a direct wave of a pulse transmitted by the UWB transceiver 110 to each of the plurality of UWB receivers 121, 122, and 123. The index time ($\tau_{FP}$) may be referred to as the index value FP_INDEX. The index time ($\tau_{FP}$) may be calculated and provided by a UWB IC of the robot 100. The value of the index time ($\tau_{FP}$) may be used to calculate a distance ($R_{FP}$) from the UWB transceiver 110 to at least one UWB receiver among the plurality of UWB receivers 121, 122, and 123.

The distance ($R_{FP}$) from the UWB transceiver 110 to the at least one UWB receiver is equal to a value ($c\tau_{FP}$) obtained by multiplying the index time ($\tau_{FP}$) by the light speed (c). The robot 100 may use this relationship to calculate the distance ($R_{FP}$) from the UWB transceiver 110 to the at least one UWB receiver.

The obstacle delay time ($\tau_{OBS}$) may be a delay time that occurs when a signal transmitted by the UWB transceiver 110 is reflected by an obstacle and reaches the at least one UWB receiver. The robot 100 may calculate a distance ($R_{OBS}$) from the at least one UWB receiver to the obstacle by using the obstacle delay time ($\tau_{OBS}$).

Twice a distance ($R_{OBS}$) from the at least one UWB receiver to the obstacle is equal to a value obtained by multiplying a difference value ($\tau_{OBS}-\tau_{FP}$) between the index time ($\tau_{FP}$) and obstacle delay time ($\tau_{OBS}$) by the light speed (c). The robot 100 may use this relationship to calculate the distance ($R_{OBS}$) between the at least one UWB receiver and the obstacle.

Figure 12:
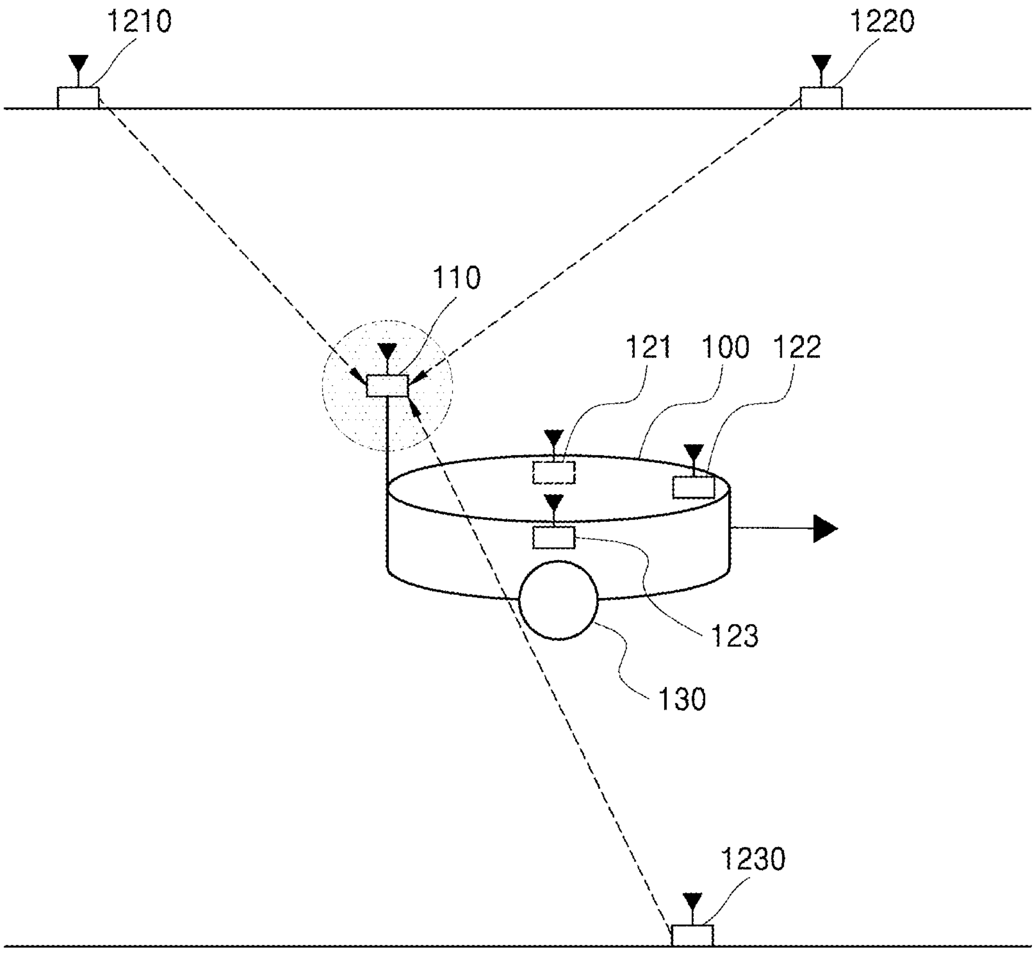
FIG. 12 is a diagram showing autonomous driving by the robot, according to an embodiment.

FIG. 12 is a diagram showing autonomous driving by the robot 100, according to an embodiment.

The UWB transceiver 110 may communicate with a plurality of anchors 1210, 1220, and 1230, namely, first, second, and third anchors 1210, 1220, and 1230. The UWB transceiver 110 may transmit location information of the robot 100 to the plurality of anchors 1210, 1220, and 1230. The robot 100 may implement a real time locating system (RTLS) by using the UWB transceiver 110 and the plurality of anchors 1210, 1220, and 1230.

The UWB transceiver 110 may measure distances to the plurality of anchors 1210, 1220, and 1230. The UWB transceiver 110 may identify a location of the robot 100, based on the distances to the plurality of anchors 1210, 1220, and 1230. The robot 100 may implement a positioning function by using the UWB transceiver 110.

The robot 100 may identify the location of the robot 100 by using the UWB transceiver 110, and may transmit the location information of the robot 100 to the outside. The robot 100 may identify its own location, and may notify its own location to the outside to thereby drive autonomously.

Figure 13A:
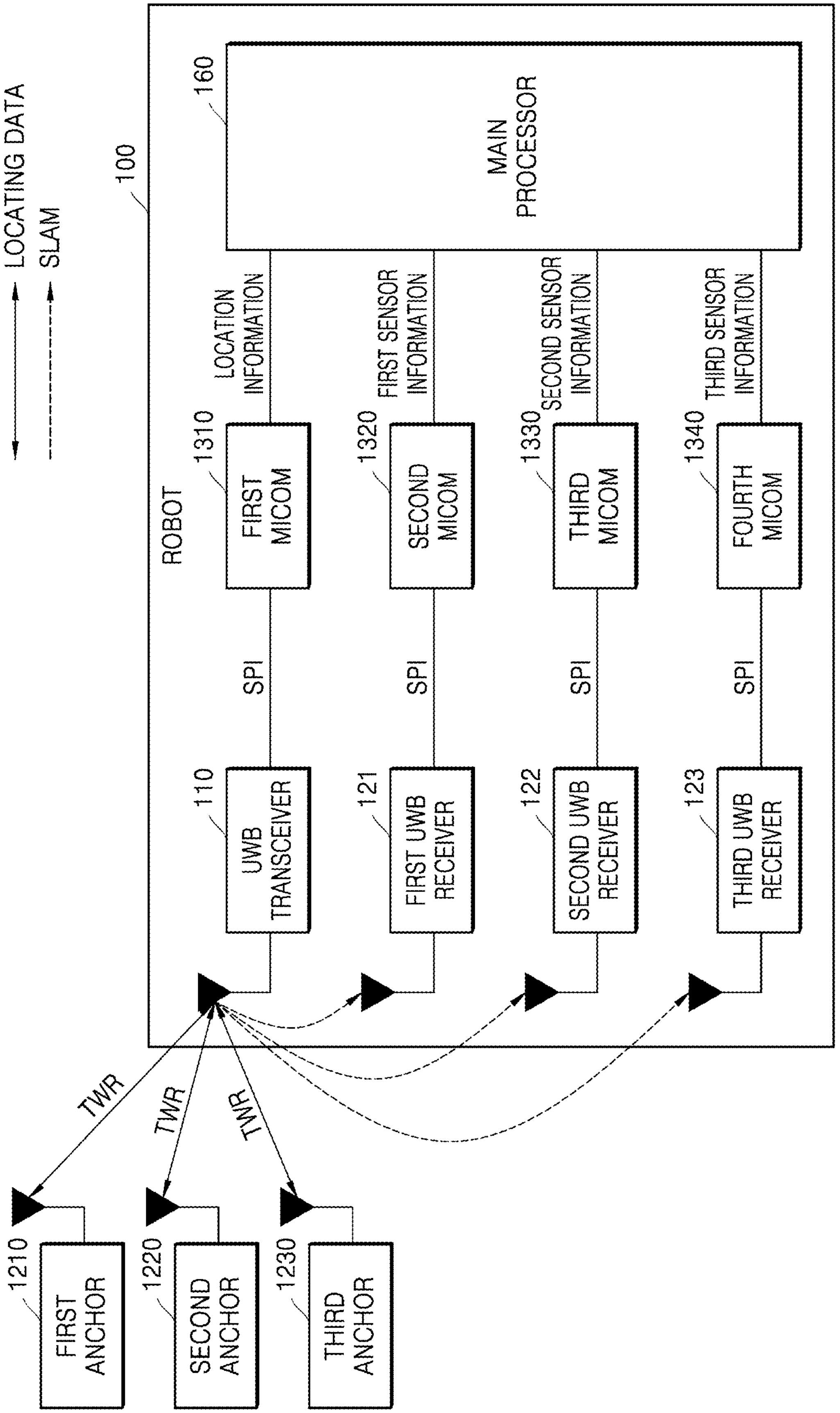
FIG. 13A is a diagram showing transmission and reception of data through communication when the robot drives autonomously, according to an embodiment.

FIG. 13A is a diagram showing transmission and reception of data through communication when the robot 100 drives autonomously, according to an embodiment.

The UWB transceiver 110 may establish two-way ranging (TWR) communication with the plurality of anchors 1210, 1220, and 1230. The UWB transceiver 110 may transmit and receive location tracking data to and from the plurality of anchors 1210, 1220, and 1230. The location tracking data may include data for identifying the location of the robot 100 and informing the location of the robot 100. The main processor 160 may control the UWB transceiver 160 to transmit and receive the location tracking data to and from the plurality of anchors 1210, 1220, and 1230.

The UWB transceiver 110 may transmit simultaneous localization and mapping (SLAM) data to the plurality of UWB receivers 121, 122, and 123. The SLAM data may include the location tracking data.

The UWB transceiver 110 and the plurality of UWB receivers 121, 122, and 123 may be connected to a plurality of micoms 1310, 1320, 1330, and 1340, namely, first, second, third, and fourth micoms 1310, 1320, 1330, and 1340, respectively, according to the SPI communication method. The UWB transceiver 110 may be connected to the first micom 1310. The first UWB receiver 121 may be connected to the second micom 1320. The second UWB receiver 122 may be connected to the third micom 1330. The third UWB receiver 123 may be connected to the fourth micom 1340. Each of the plurality of micros 1310, 1320, 1330, and 1340 may be connected to the main processor 160.

The UWB transceiver 110 may generate location information. The location information may include information associated with a current location of the robot 100. The UWB transceiver 110 may transmit the location information to the main processor 160. The main processor 160 may control the UWB transceiver 110 to generate the location information. The main processor 160 may control the UWB transceiver 110 to transmit the location information to the main processor 160.

The first UWB receiver 121 may generate first sensor information. The first sensor information may include map information of the left side of the robot 100. The first UWB receiver 121 may transmit the first sensor information to the main processor 160. The main processor 160 may control the first UWB receiver 121 to generate the first sensor information. The main processor 160 may control the first UWB receiver 121 to transmit the first sensor information to the main processor 160.

The second UWB receiver 122 may generate second sensor information. The second sensor information may include map information of the front surface of the robot 100. The second UWB receiver 122 may transmit the second sensor information to the main processor 160. The main processor 160 may control the second UWB receiver 122 to generate the second sensor information. The main processor 160 may control the second UWB receiver 122 to transmit the second sensor information to the main processor 160.

The third UWB receiver 123 may generate third sensor information. The third sensor information may include map information of the right side of the robot 100. The third UWB receiver 123 may transmit the third sensor information to the main processor 160. The main processor 160 may control the third UWB receiver 123 to generate the third sensor information. The main processor 160 may control the third UWB receiver 123 to transmit the third sensor information to the main processor 160.

The main processor 160 may receive the location information from the UWB transceiver 110. The main processor 160 may receive the first sensor information from the first UWB receiver 121. The main processor 160 may receive the second sensor information from the second UWB receiver 122. The main processor 160 may receive the third sensor information from the third UWB receiver 123. The main processor 160 may identify the location of the robot 100, based on the location information, the first sensor information, the second sensor information, and the third sensor information, and may notify the location of the robot 100. The main processor 160 may autonomously drive the robot 100, based on the location information, the first sensor information, the second sensor information, and the third sensor information.

Figure 13B:
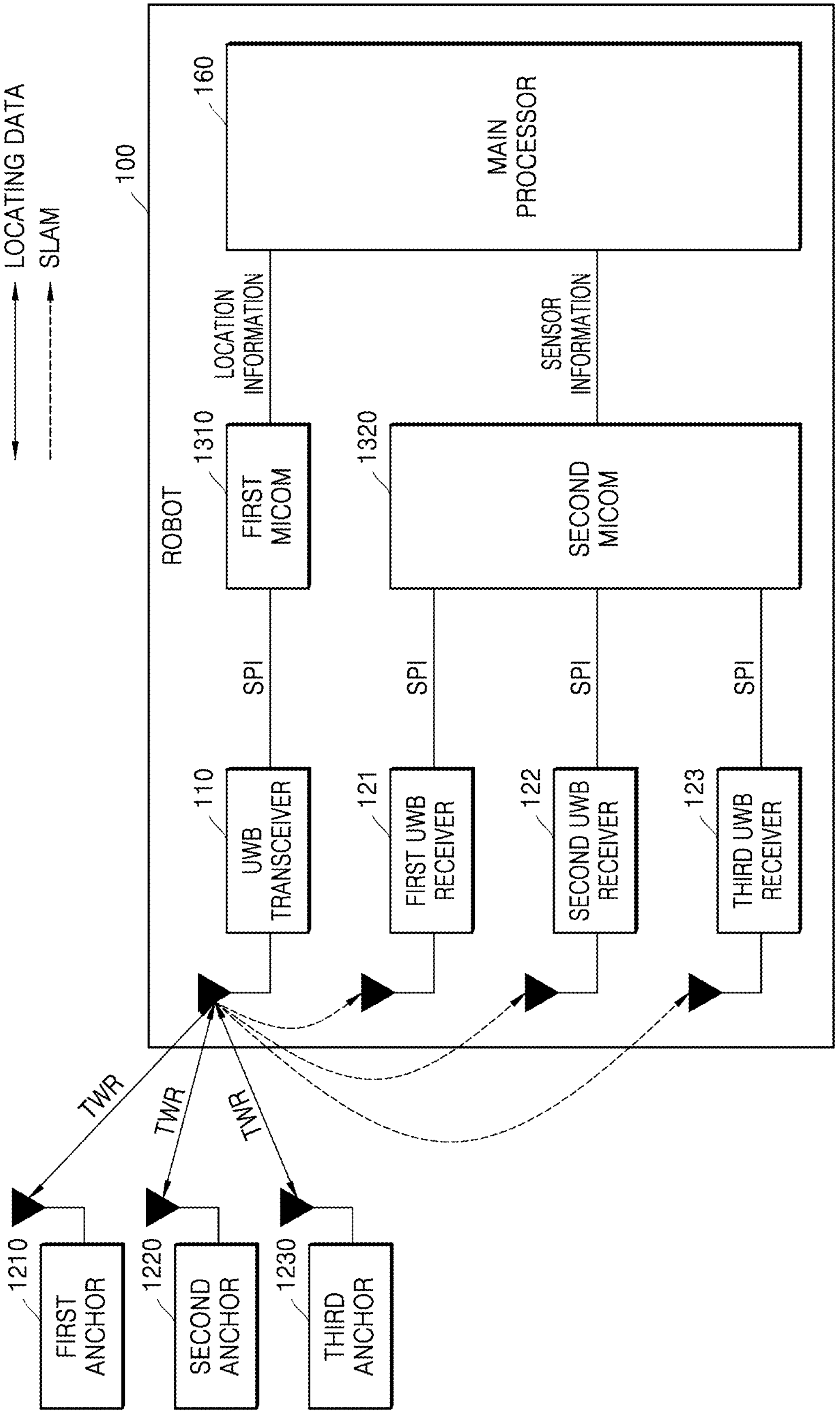
FIG. 13B is a diagram showing transmission and reception of data through communication when the robot drives autonomously, according to an embodiment.

FIG. 13B is a diagram showing transmission and reception of data through communication when the robot 100 drives autonomously, according to an embodiment.

The UWB transceiver 110 may establish TWR communication with the plurality of anchors 1210, 1220, and 1230. The UWB transceiver 110 may transmit and receive location tracking data to and from the plurality of anchors 1210, 1220, and 1230. The UWB transceiver 110 may transmit SLAM data to the plurality of UWB receivers 121, 122, and 123.

The UWB transceiver 110 may be connected to the first micom 1310 according to the SPI communication method. The plurality of UWB receivers 121, 122, and 123 may be connected to the second micom 1320 according to the SPI communication method. The second micom 1320 may be connected to a plurality of (e.g., three) antennas. The first micom 1310 and the second micom 1320 may be connected to the main processor 160.

The UWB transceiver 110 may transmit the location information to the main processor 160 via the first micom 1310. The plurality of UWB receivers 121, 122, and 123 may transmit sensor information to the main processor 160 via the second micom 1320. The sensor information may include map information of the surroundings of the robot 100.

The main processor 160 may receive the location information via the first micom 1310. The main processor 160 may receive the sensor information via the second micom 1320. The main processor 160 may autonomously drive the robot 100, based on the location information and the sensor information.

Figure 13C:
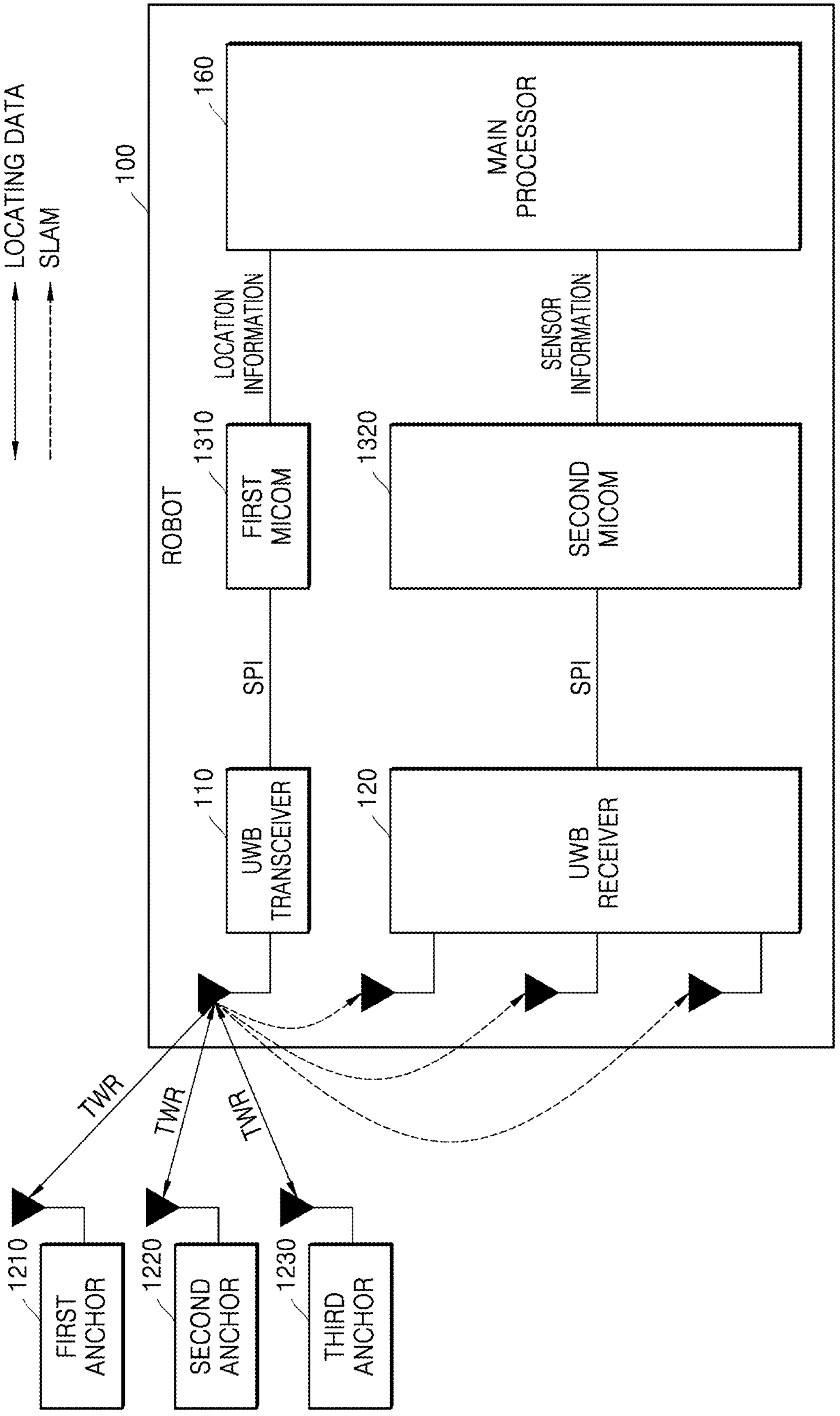
FIG. 13C is a diagram showing transmission and reception of data through communication when the robot drives autonomously, according to an embodiment.

FIG. 13C is a diagram showing transmission and reception of data through communication when the robot 100 drives autonomously, according to an embodiment.

The UWB transceiver 110 may establish TWR communication with the plurality of anchors 1210, 1220, and 1230. The UWB transceiver 110 may transmit and receive location tracking data to and from the plurality of anchors 1210, 1220, and 1230. The UWB transceiver 110 may transmit SLAM data to a UWB receiver 120.

The UWB transceiver 110 may be connected to the first micom 1310 according to the SPI communication method. The UWB receiver 120 may be connected to the second micom 1320 according to the SPI communication method. The second micom 1320 may be connected to a plurality of (e.g., three) antennas. The first micom 1310 and the second micom 1320 may be connected to the main processor 160.

The UWB transceiver 110 may transmit the location information to the main processor 160 via the first micom 1310. The UWB transceiver 120 may transmit the sensor information to the main processor 160 via the second micom 1320. The sensor information may include map information of the surroundings of the robot 100.

The main processor 160 may receive the location information via the first micom 1310. The main processor 160 may receive the sensor information via the second micom 1320. The main processor 160 may autonomously drive the robot 100, based on the location information and the sensor information.

When there is only one UWB receiver 120, the manufacturing costs of the robot 100 may be reduced. When there is one UWB receiver 120, a packet may be modified when the UWB transceiver 11 transmits data.

Figure 13D:
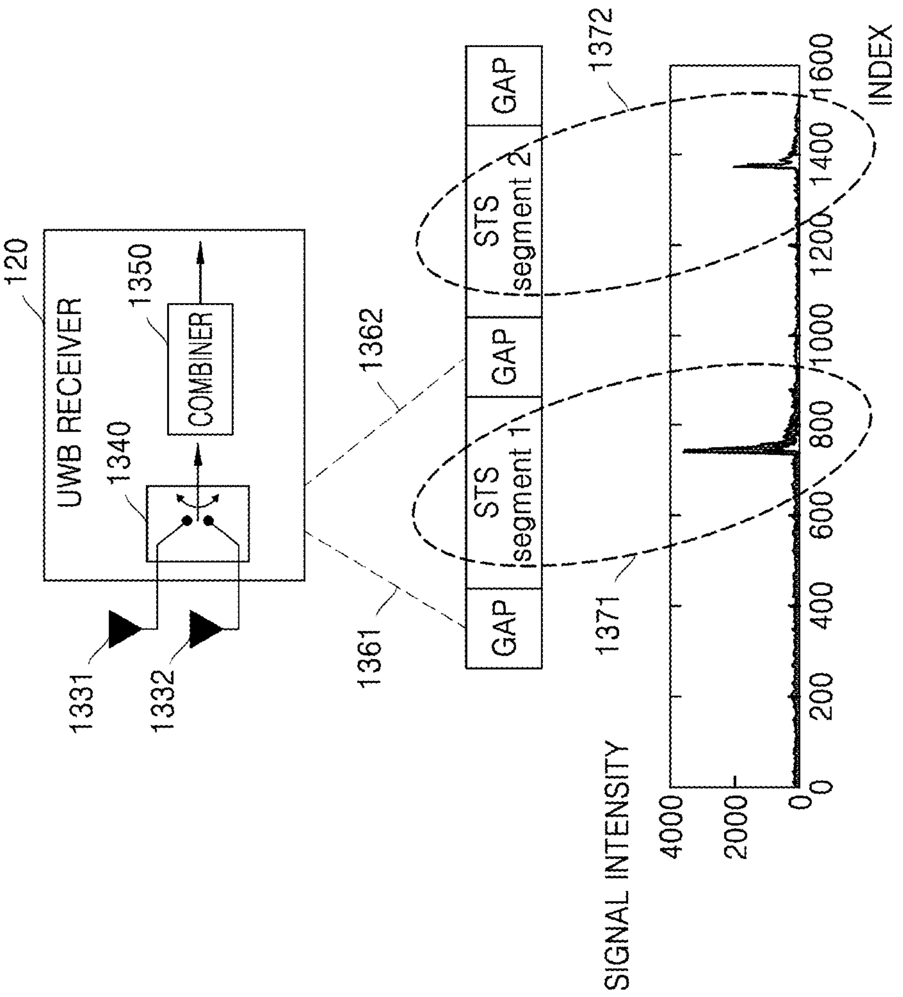
FIG. 13D is a diagram showing a UWB receiver and a structure of data that is processed by the UWB receiver, when the robot according to an embodiment transmits and receives data as in FIG. 13C.

FIG. 13D is a diagram showing the UWB receiver 120 and the structure of data that is processed by the UWB receiver 120, when the robot 100 according to an embodiment transmits and receives data as in FIG. 13C.

The UWB receiver 120 according to an embodiment may switch a first antenna 1331 and a second antenna 1332 in a gap section. When the UWB receiver 120 is using the first antenna 1331, the UWB receiver 120 may change the currently-being-used antenna to the second antenna 1332 in the gap section. When the UWB receiver 120 is using the second antenna 1332, the UWB receiver 120 may change the currently-being-used antenna to the first antenna 1331 in the gap section. For example, the UWB receiver 120 may change the currently-being-used antenna to the first antenna 1331 in a first gap section 1361. For example, the UWB receiver 120 may change the currently-being-used antenna to the second antenna 1332 in a second gap section 1362. The UWB receiver 120 may switch the first antenna 1331 and the second antenna 1332 in a section by using a switch 1340.

The UWB receiver 120 may receive a signal from one of the first antenna 1331 and the second antenna 1332 by using a combiner 1350. The UWB receiver 120 may receive a first segment signal 1371 and a second segment signal 1372. The first segment signal 1371 and the second segment signal 1372 may be an example of channel impulse response data that may be obtained by receiving a blink message. For example, the UWB receiver 120 may receive the first segment signal 1371 from the first antenna 1331 in a first segment section. For example, the UWB receiver 120 may receive the second segment signal 1372 from the second antenna 1332 in a second segment section.

In more detail, a UWB packet according to an embodiment may include three sections (preamble, gap, and Scrambled Timestamp Sequence (STS)). The STS is a field of an encryption function added in IEEE 802.15.4z-2020 HRP UWB standardized in 2020. By utilizing the STS field for direction detection, an antenna of a simple hardware structure (e.g., a switched array antenna) may be used rather than two receivers that share a clock.

The UWB receiver 120 may enable a preamble section to be received when reception of a UWB packet begins. The UWB receiver 120 may switch an antenna in a gap section after the reception of the preamble section is completed.

The UWB receiver 120 may receive an STS segment 1 section by connecting the switch 1340 to the first antenna 1331 when the STS segment 1 section of the UWB packet is received. The UWB receiver 120 may receive the STS segment 1 section by changing the switch 1340 to be connected to the second antenna 1332 in the first gap section 1361 after the reception of the STS segment 1 section is completed.

The robot 100 according to an embodiment may use only one UWB receiver 120 by switching the first antenna 1331 and the second antenna 1332 in a gap section of the UWB packet. The robot 100 according to an embodiment may use up to four antennas for the one UWB receiver 120.

Figure 14A:
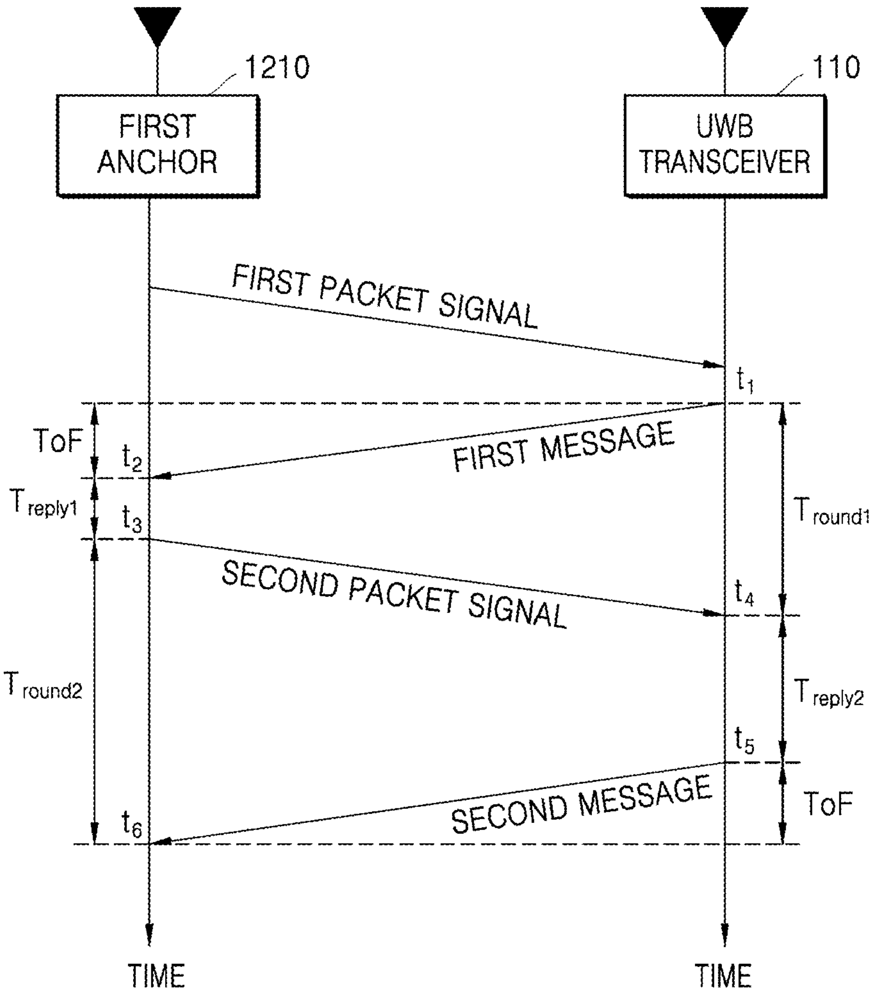
FIG. 14A is a diagram showing transmission and reception of packet signals and messages when the robot drives autonomously, according to an embodiment.

FIG. 14A is a diagram showing transmission and reception of packet signals and messages when the robot 100 drives autonomously, according to an embodiment.

The UWB transceiver 110 of the robot 100 may receive packet signals from the plurality of anchors 1210, 1220, and 1230, and may transmit messages to the plurality of anchors 1210, 1220, and 1230 in response to the packet signals. The UWB transceiver 110 may individually receive packet signals from the plurality of anchors 1210, 1220, and 1230, and may individually transmit messages to the plurality of anchors 1210, 1220, and 1230. FIG. 14A illustrates a case where the UWB transceiver 110 receives a packet signal from the first anchor 1210 among the plurality of anchors 1210, 1220, and 1230 and transmits a message to the first anchor 1210. However, embodiments are not limited thereto, and the UWB transceiver 110 may receive packet signals from the first anchor 1220 and the third anchor 1230, and may transmit messages to the plurality of anchors 1210, 1220, and 1230 in response to the packet signals.

The UWB transceiver 110 may receive a first sensor information from the first anchor 1210. The first packet signal may include a ranging initialization signal. The ranging initialization signal may include an initial distance value for performing distance measurement. The UWB transceiver 110 may receive the first sensor information at a first time point $t_1$.

The UWB transceiver 110 may transmit a first message to the first anchor 1210. The first message may include a poll message. The poll message may include information associated with the current location of the robot 100. The first message may be propagated to the first anchor 1210 during a time of flight (ToF). The first message may reach the first anchor 1210 at a second time point $t_2$. The first anchor 1210 may transmit a second packet signal to the UWB transceiver 110 at a third time point $t_3$ after the first response time $T_{reply1}$ has elapsed.

The UWB transceiver 110 may receive the second packet signal from the first anchor 1210. The second packet signal may include a response signal. The response signal may include response contents for the poll signal. The UWB transceiver 110 may receive the first packet signal at a fourth time point $t_4$ after a first round time $T_{round1}$ has elapsed from the first time point $t_1$.

The UWB transceiver 110 may transmit a second message to the first anchor 1210 at a fifth time point $t_5$ after a second response time $T_{reply2}$ has elapsed from the fourth time point $t_4$. The second message may include a final message. The final message may include information associated with a final location of the robot 100. The second message may be propagated to the first anchor 1210 during a ToF. The second message may reach the first anchor 1210 at a sixth time point to after a second round time $T_{round2}$ has elapsed from the third time point $t_3$.

The first anchor 1210 may measure a distance from the first anchor 1210 to the robot 100, based on the second message. The first anchor 1210 may inform the UWB transceiver 110 of the measured distance from the first anchor 1210 to the robot 100 in the form of an ACK message.

Figure 14B:
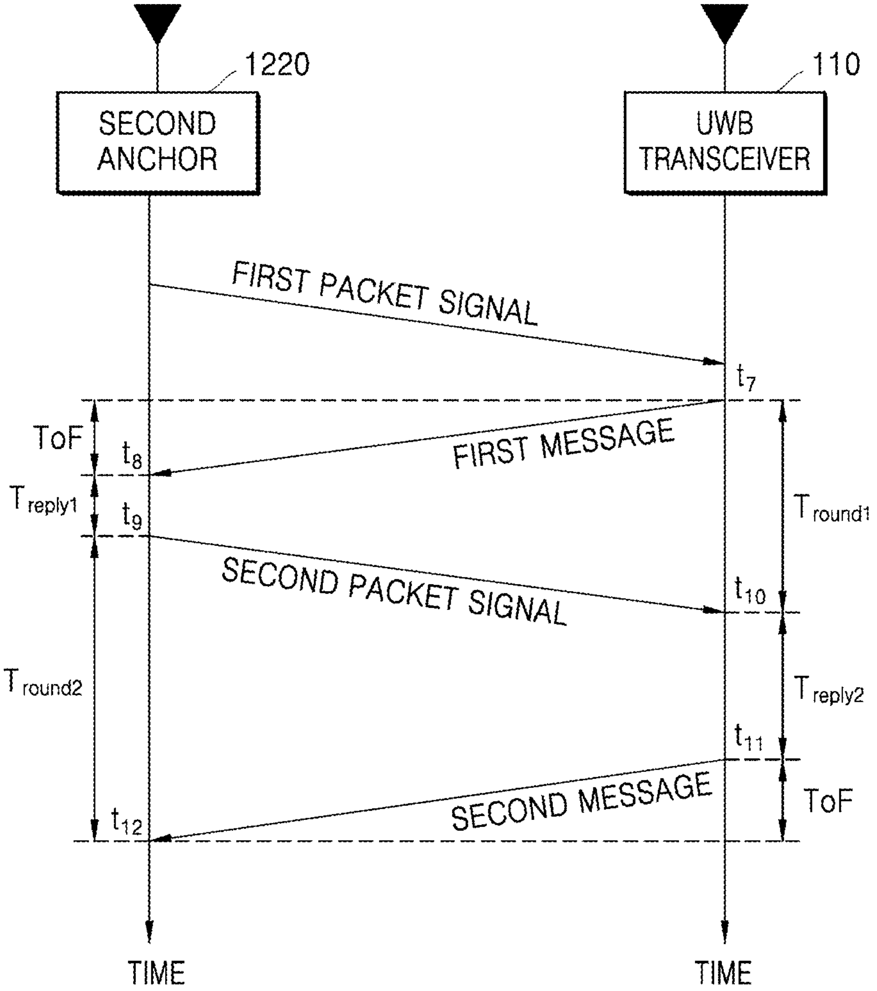
FIG. 14B is a diagram showing transmission and reception of packet signals and messages when the robot drives autonomously, according to an embodiment.

FIG. 14B is a diagram showing transmission and reception of packet signals and messages when the robot 100 drives autonomously, according to an embodiment. FIG.

14B may show that transmission and reception with the second anchor 1220 is sequentially repeated after transmission and reception with the first anchor 1210 as in FIG. 14A.

The UWB transceiver 110 of the robot 100 may receive packet signals from the plurality of anchors 1210, 1220, and 1230, and may transmit messages to the plurality of anchors 1210, 1220, and 1230 in response to the packet signals. The UWB transceiver 110 may individually receive packet signals from the plurality of anchors 1210, 1220, and 1230, and may individually transmit messages to the plurality of anchors 1210, 1220, and 1230. FIG. 14B illustrates a case where the UWB transceiver 110 receives a packet signal from the second anchor 1220 among the plurality of anchors 1220, 1220, and 1230 and transmits a message to the second anchor 1220.

The UWB transceiver 110 may receive a first packet signal from the second anchor 1220 at a seventh time point $t_7$.

The UWB transceiver 110 may transmit a first message to the second anchor 1220. The first message may reach the second anchor 1220 at an eighth time point $t_8$. The second anchor 1220 may transmit a second packet signal to the UWB transceiver 110 at a ninth time point to after the first response time $T_{reply1}$ has elapsed.

The UWB transceiver 110 may receive the first packet signal at a tenth time point $t_{10}$ after the first round time $T_{round1}$ has elapsed from the seventh time point $t_7$.

The UWB transceiver 110 may transmit a second message to the second anchor 1220 at an eleventh time point $t_{11}$ after the second response time $T_{reply2}$ has elapsed from the tenth time point $t_{10}$. The second message may reach the second anchor 1220 at a twelfth time point $t_{12}$ after the second round time $T_{round2}$ has elapsed from the ninth time point $t_9$.

The second anchor 1220 may measure a distance from the second anchor 1220 to the robot 100, based on the second message. The second anchor 1220 may inform the UWB transceiver 110 of the measured distance from the second anchor 1220 to the robot 100 in the form of an ACK message.

Figure 14C:
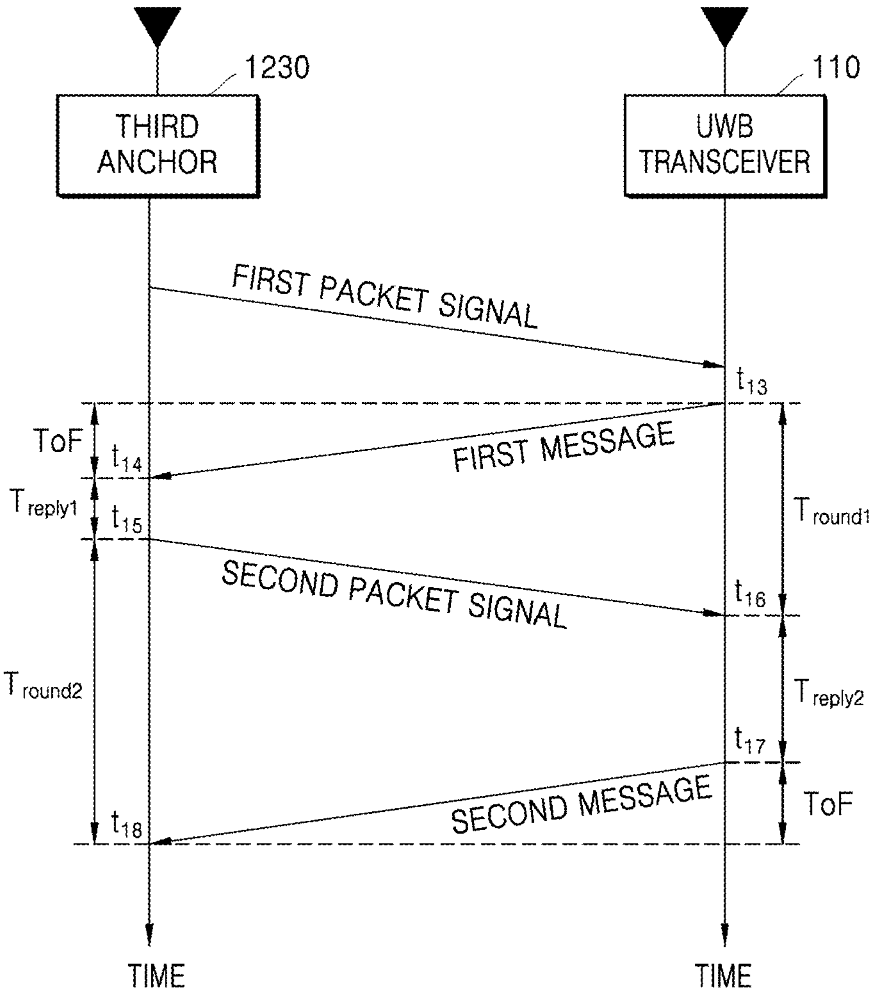
FIG. 14C is a diagram showing transmission and reception of packet signals and messages when the robot drives autonomously, according to an embodiment.

FIG. 14C is a diagram showing transmission and reception of packet signals and messages when the robot 100 drives autonomously, according to an embodiment. FIG. 14C may show that transmission and reception with the third anchor 1230 is sequentially repeated after transmission and reception with the second anchor 1220 as in FIG. 14B.

The UWB transceiver 110 of the robot 100 may receive packet signals from the plurality of anchors 1210, 1220, and 1230, and may transmit messages to the plurality of anchors 1210, 1220, and 1230 in response to the packet signals. The UWB transceiver 110 may individually receive packet signals from the plurality of anchors 1210, 1220, and 1230, and may individually transmit messages to the plurality of anchors 1210, 1220, and 1230. FIG. 14C illustrates a case where the UWB transceiver 110 receives a packet signal from the third anchor 1230 among the plurality of anchors 1230, 1230, and 1230 and transmits a message to the third anchor 1230.

The UWB transceiver 110 may receive a first packet signal from the third anchor 1230 at a thirteenth time point $t_{13}$.

The UWB transceiver 110 may transmit a first message to the third anchor 1230. The first message may reach the third anchor 1230 at a fourteenth time point $t_{14}$. The third anchor 1230 may transmit a second packet signal to the UWB transceiver 110 at a fifteenth time point $t_{15}$ after the first response time $T_{reply1}$ has elapsed.

The UWB transceiver 110 may receive the first packet signal at a sixteenth time point $t_{16}$ after the first round time $T_{round1}$ has elapsed from the thirteenth time point $t_{13}$.

The UWB transceiver 110 may transmit a second message to the third anchor 1230 at the seventeenth time point $t_{17}$ after a second response time $T_{reply2}$ has elapsed from the sixteenth time point $t_{16}$. The second message may reach the third anchor 1230 at an eighteenth time point $t_{18}$ after the second round time $T_{round2}$ has elapsed from the fifteenth time point $t_{15}$.

The third anchor 1230 may measure a distance from the third anchor 1230 to the robot 100, based on the second message. The third anchor 1230 may inform the UWB transceiver 110 of the measured distance from the third anchor 1230 to the robot 100 in the form of an ACK message.

Referring to FIGS. 14A, 14B, and 14C, as the processes of FIGS. 14A, 14B, and 14C are repeated by the first anchor 1210, the second anchor 1220, and the third anchor 1230, the robot 100 may identify its own location according to trigonometry and drive autonomously.

Figure 15:
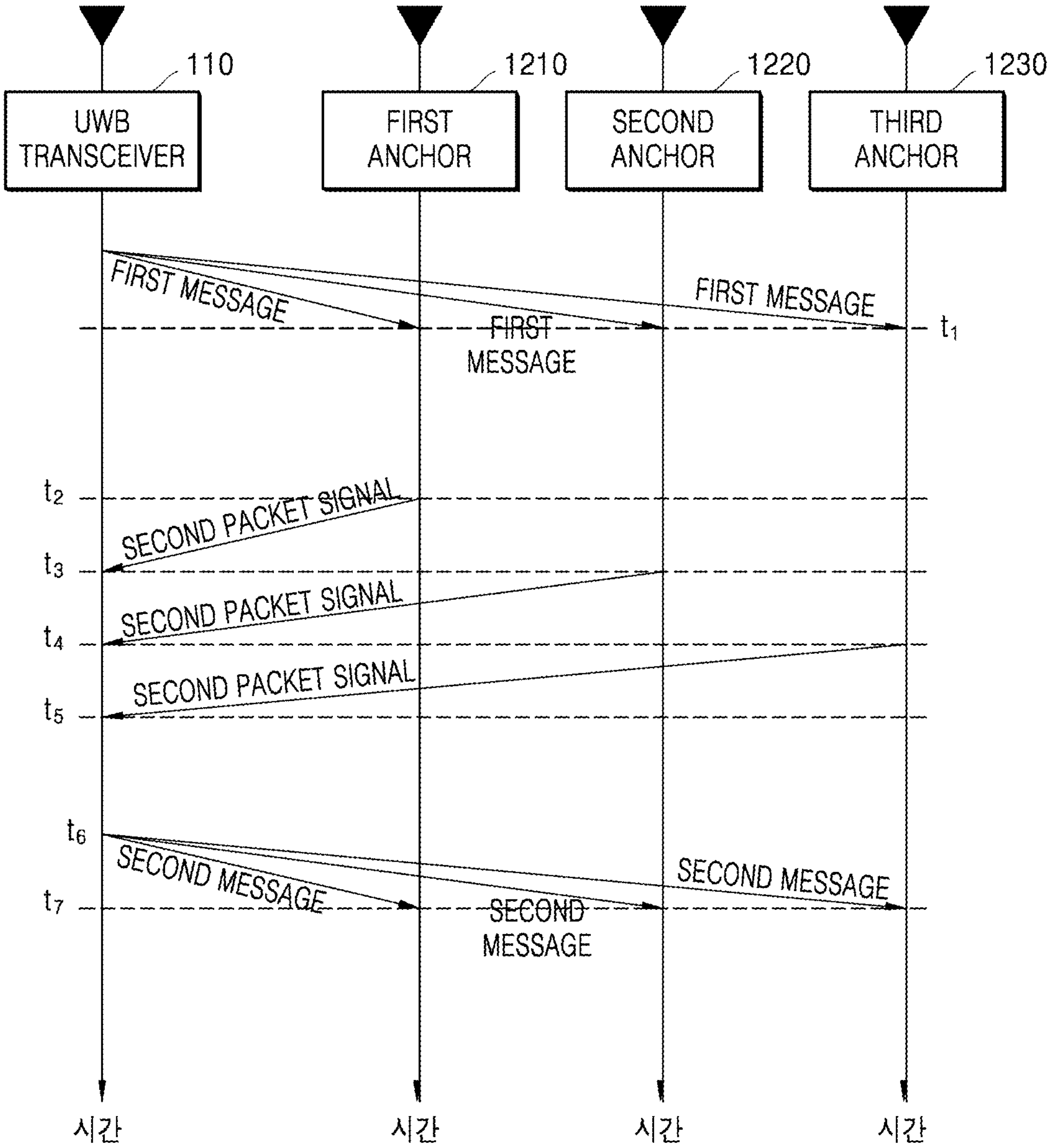
FIG. 15 is a diagram showing transmission and reception of packet signals and messages when the robot drives autonomously, according to an embodiment.

FIG. 15 is a diagram showing transmission and reception of packet signals and messages when the robot 100 drives autonomously, according to an embodiment.

The UWB transceiver 110 of the robot 100 may receive packet signals from the plurality of anchors 1210, 1220, and 1230, and may transmit messages to the plurality of anchors 1210, 1220, and 1230 in response to the packet signals. The UWB transceiver 110 may simultaneously or sequentially receive packet signals from the plurality of anchors 1210, 1220, and 1230, and may sequentially transmit messages to the plurality of anchors 1210, 1220, and 1230.

The UWB transceiver 110 may simultaneously transmit a first message to the plurality of anchors 1210, 1220, and 1230. The first message may include a poll message. The plurality of anchors 1210, 1220, and 1230 may receive the first message at a first time point $t_1$.

The first anchor 1210 may transmit a second packet signal at a second time point $t_2$. The second packet signal may include a response signal. The UWB transceiver 110 may receive the second packet signal from the first anchor 1210 at a third time point $t_3$. A time period it takes for this to happen may be about 1,200 μs.

The second anchor 1220 may transmit a second packet signal at a third time point $t_3$. The UWB transceiver 110 may receive the second packet signal from the second anchor 1220 at a fourth time point $t_4$. A time period it takes for this to happen may be about 1,800 μs.

The third anchor 1230 may transmit the second packet signal at a fourth time point $t_4$. The UWB transceiver 110 may receive the second packet signal from the third anchor 1230 at a fifth time point $t_5$. A time period it takes for this to happen may be about 2,700 μs.

The UWB transceiver 110 may transmit a second message to the sixth anchor to. The second message may include a final message. The UWB transceiver 110 may sequentially transmit the second message to the plurality of anchors 1210, 1220, and 1230. The first anchor 1210 may transmit the second message at a seventh time point $t_7$. The second anchor 1220 may receive the second message at the seventh time point $t_7$. The third anchor 1230 may receive the second message at the seventh time point $t_7$.

According to an embodiment, a single poll message may be transmitted to the plurality of anchors 1210, 1220, and 1230, so that the plurality of anchors 1210, 1220, and 1230 respond consecutively at time intervals. After individually receiving three response signals from the plurality of anchors 1210, 1220, and 1230, the UWB transceiver 110 may individually transmit final messages to the plurality of anchors 1210, 1220, and 1230. When the plurality of anchors 1210, 1220, and 1230 consecutively respond at time intervals by transmitting a single poll message, the complexity of a system may be reduced, and real-time locating indoors may improve accuracy.

The UWB transceiver 110 according to an embodiment may calculate the location information. According to an embodiment, after each of the plurality of anchors 1210, 1220, and 1230 receives a final message from the UWB transceiver 110, the plurality of anchors 1210, 1220, and 1230 may consecutively transmit ACK messages to the UWB transceiver 110 at regular time intervals. The ACK messages may include respective location coordinates of the plurality of anchors 1210, 1220, and 1230 and distance information regarding distances measured by the plurality of anchors 1210, 1220, and 1230. The UWB transceiver 110 may calculate the current location according to trigonometry, based on the ACK message.

Figure 16:
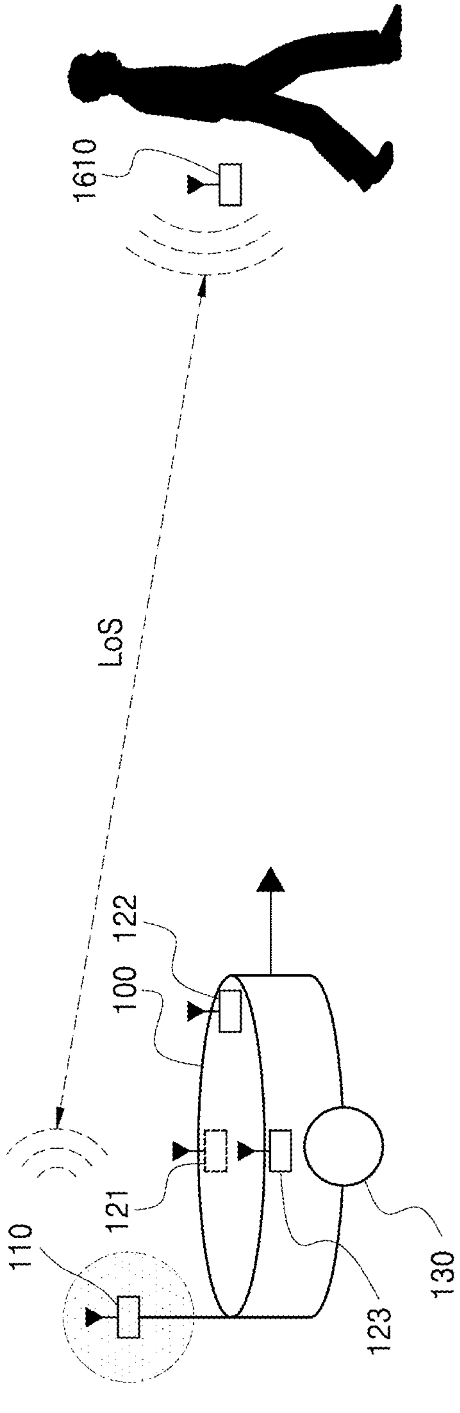
FIG. 16 is a diagram showing the robot following a mobile anchor of a user, according to an embodiment.

FIG. 16 is a diagram showing the robot 100 following a mobile anchor 1610 of a user, according to an embodiment.

The UWB transceiver 110 may transmit an LoS toward the mobile anchor 1610. To implement a function of the robot 100 to follow the user, the UWB transceiver 110 may establish TWR communication with the mobile anchor 1610. The UWB transceiver 110 may periodically transmit a ranging initialization signal. The main processor 160 of the robot 100 may control the UWB transceiver 110 to periodically transmit an LoS toward the mobile anchor 1610. The UWB transceiver 110 may follow a user carrying the mobile anchor 1610.

Figure 17:
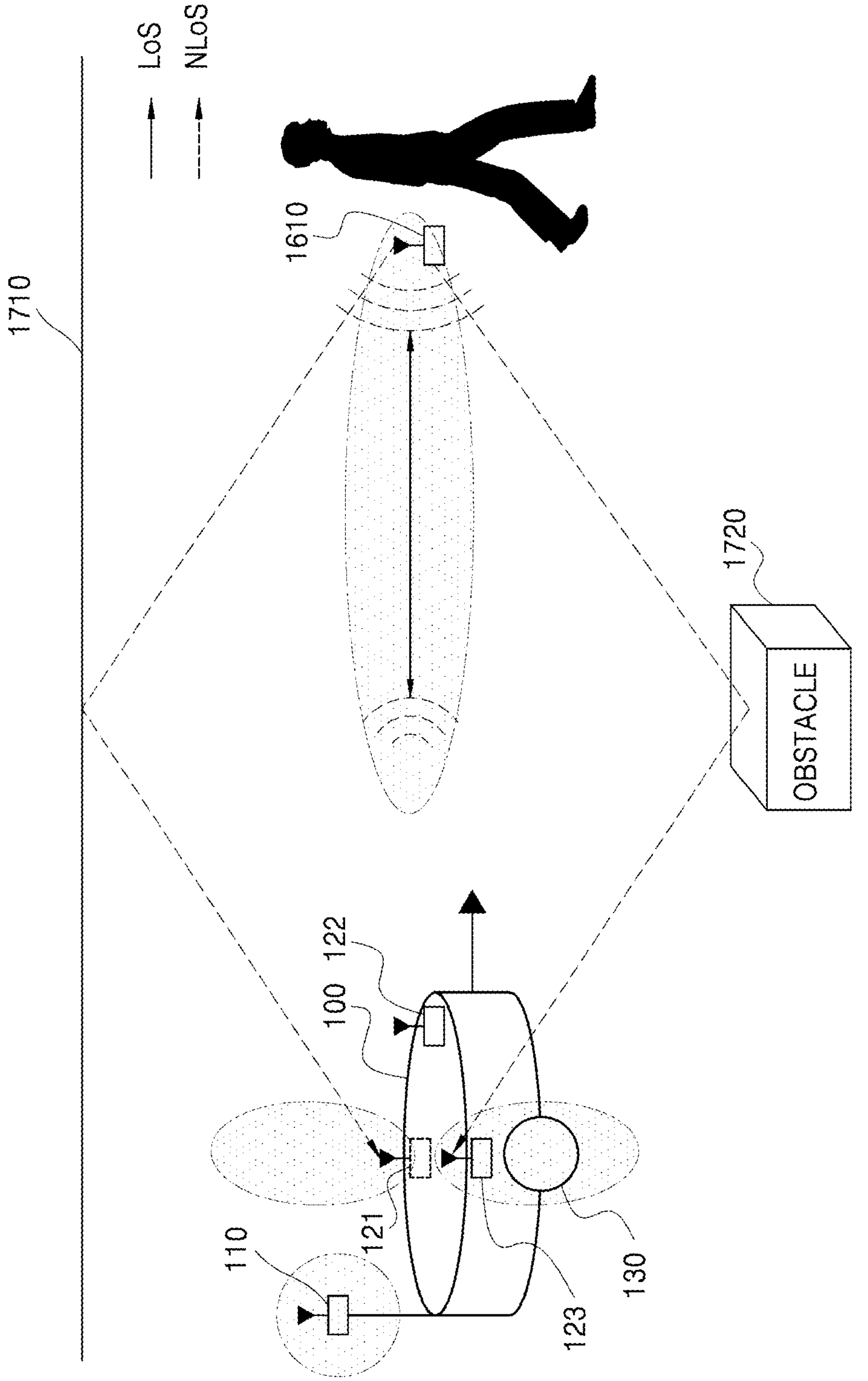
FIG. 17 is a diagram showing the robot following the mobile anchor of the user, according to an embodiment.

FIG. 17 is a diagram showing the robot 100 following the mobile anchor 1610 of a user, according to an embodiment.

The plurality of UWB receivers 121, 122, and 123 may receive an NLoS from the mobile anchor 1610. The main processor 160 of the robot 100 may control the plurality of UWB receivers 121, 122, and 123 to receive an NLoS from the mobile anchor 1610. The UWB transceiver 110 may follow a mobile anchor, based on the NLoS. The plurality of UWB receivers 121, 122, and 123 may follow the user carrying the mobile anchor 1610 while continuously obtaining the map information of the surroundings of the robot 100, based on the NLoS.

Figure 18:
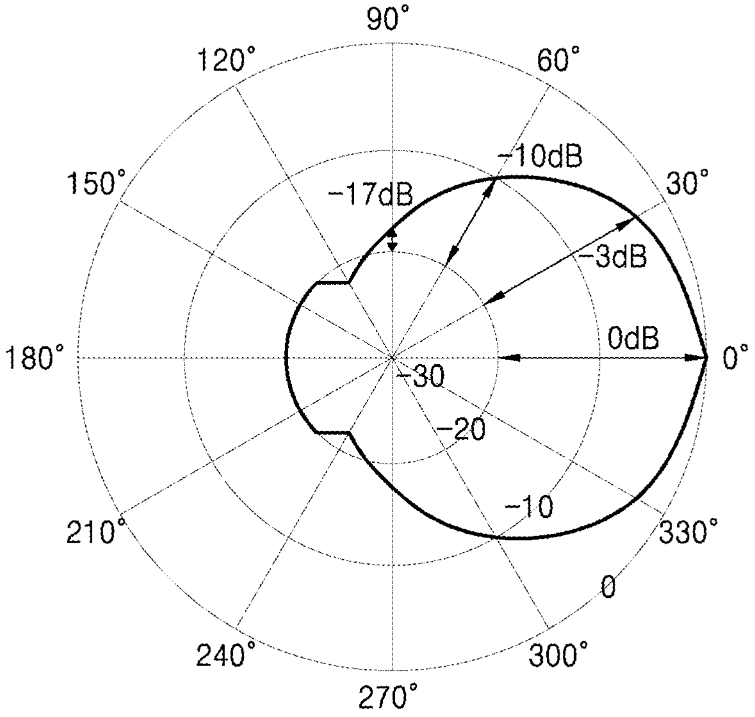
FIG. 18 is a diagram showing a radiation pattern of a signal when the robot emits the signal to follow the mobile anchor of the user, according to an embodiment.

FIG. 18 is a diagram showing a radiation pattern of a signal when the robot 100 emits the signal to follow the mobile anchor 1610 of a user, according to an embodiment.

A UWB signal transmitted by the UWB transceiver 110 may have different sizes according to different directions. When the traveling direction of the robot 100 is defined as 0 degrees, the UWB signal may have a size of 0 dB toward 0 degrees. When the traveling direction of the robot 100 is defined as 0 degrees, the UWB signal may have a size of −3 dB toward 30 degrees. When the traveling direction of the robot 100 is defined as 0 degrees, the UWB signal may have a size of −10 dB toward 60 degrees. When the traveling direction of the robot 100 is defined as 0 degrees, the UWB signal may have a size of −17 dB toward 90 degrees.

Figure 19:
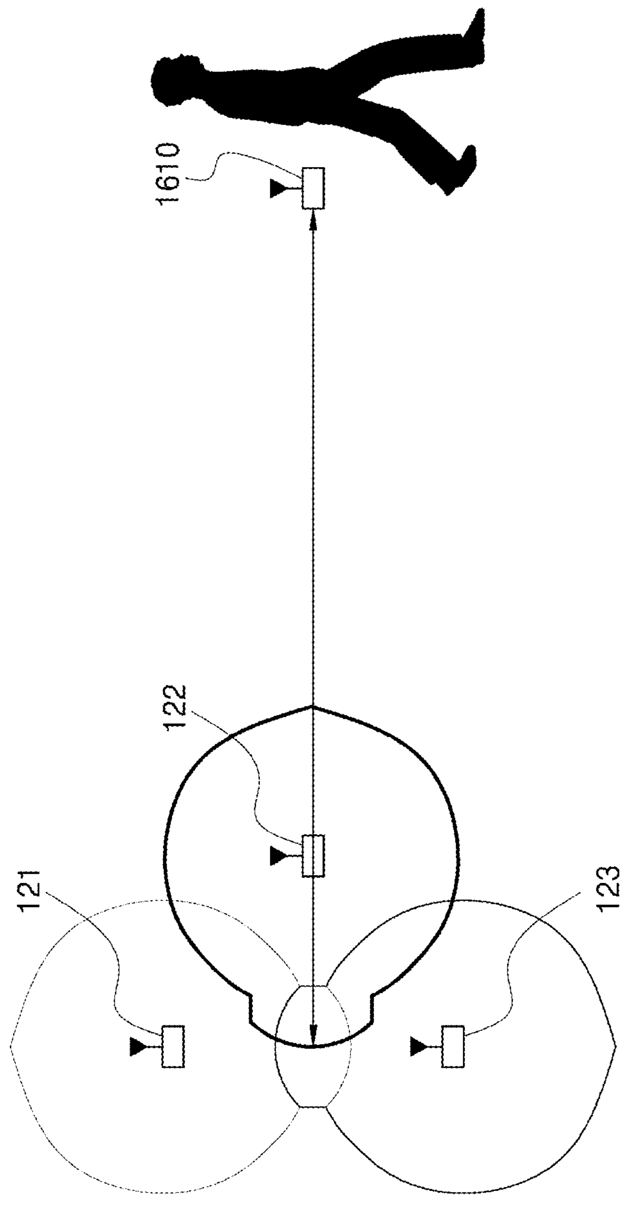
FIG. 19 is a diagram illustrating a case where when the mobile anchor is in front of the robot when the robot follows the mobile anchor of the user, according to an embodiment.

FIG. 19 is a diagram illustrating a case where when the mobile anchor 1610 is in front of the robot 100 when the robot 100 follows the mobile anchor 1610 of a user, according to an embodiment. FIG. 19 is a diagram illustrating a case where when the mobile anchor 1610 is on the left side of the robot 100 when the robot 100 follows the mobile anchor 1610 of a user, according to an embodiment. FIG. 19 is a diagram illustrating a case where when the mobile anchor 1610 is on the right side of the robot 100 when the robot 100 follows the mobile anchor 1610 of a user, according to an embodiment.

When the mobile anchor 1610 is in front of the robot 100 as shown in FIG. 19, a signal intensity of the NLoS received by the first UWB receiver 121 may be −17 dB. When the mobile anchor 1610 is in front of the robot 100, a signal intensity of the NLoS received by the second UWB receiver 122 may be 0 dB. When the mobile anchor 1610 is in front of the robot 100, a signal intensity of the NLoS received by the third UWB receiver 123 may be −17 dB.

Figure 20:
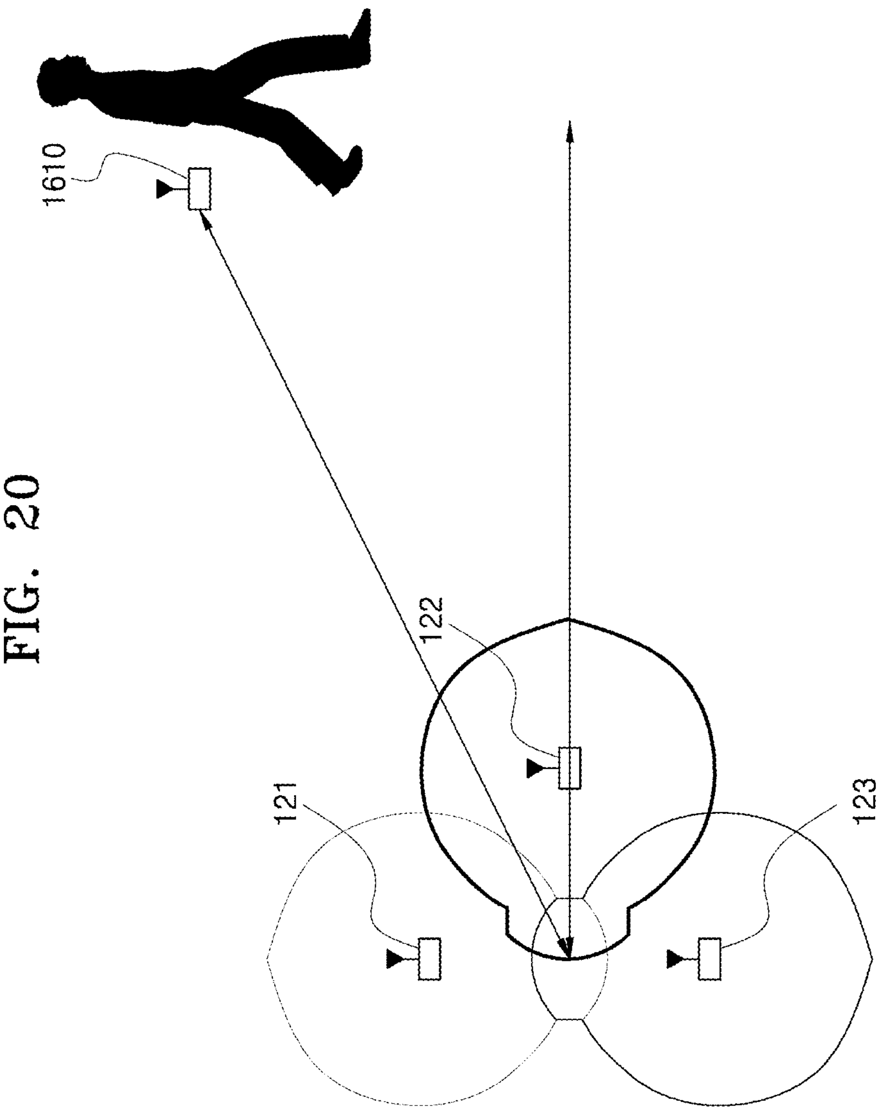
FIG. 20 is a diagram illustrating a case where when the mobile anchor is on the left side of the robot when the robot follows the mobile anchor of the user, according to an embodiment.

When the mobile anchor 1610 is on the left side of the robot 100 as shown in FIG. 20, a signal intensity of the NLoS received by the first UWB receiver 121 may be −3 dB. When the mobile anchor 1610 is on the left side of the robot 100, a signal intensity of the NLoS received by the second UWB receiver 122 may be −10 dB. When the mobile anchor 1610 is on the left side of the robot 100, a signal intensity of the NLoS received by the third UWB receiver 123 may be −20 dB.

Figure 21:
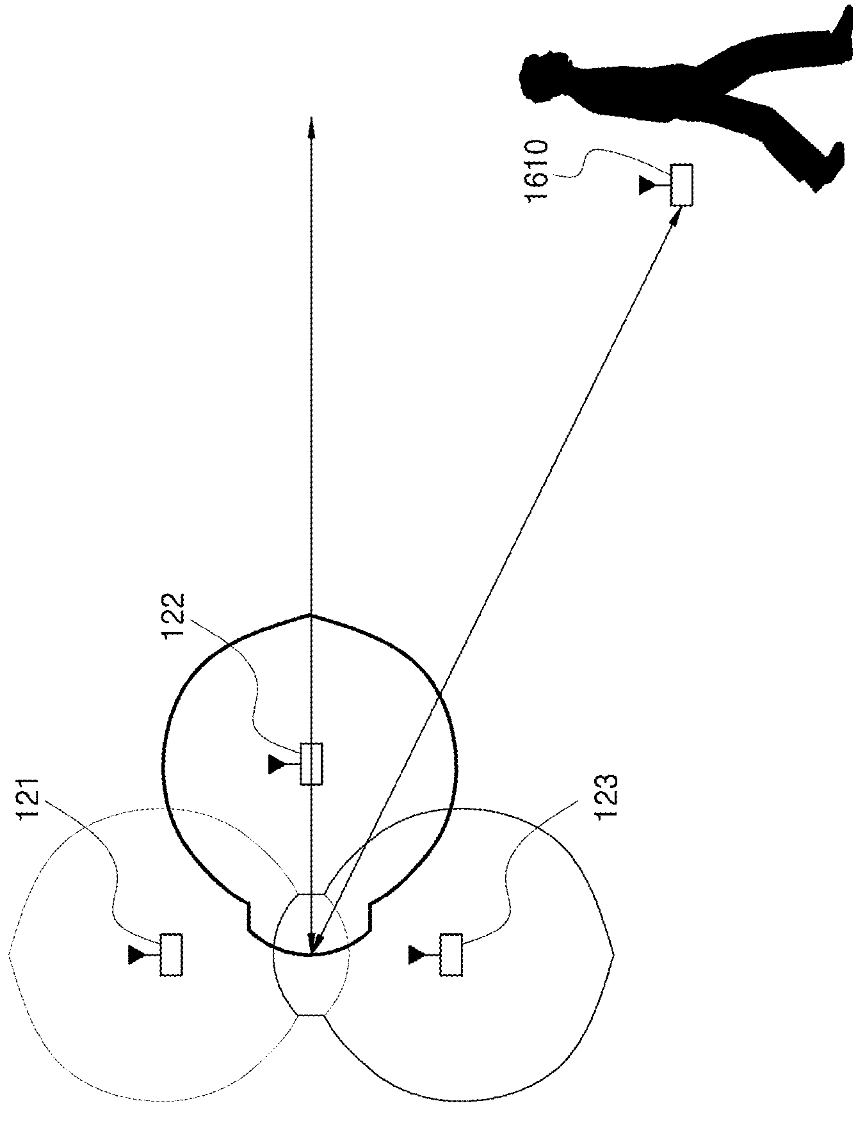
FIG. 21 is a diagram illustrating a case where when the mobile anchor is on the right side of the robot when the robot follows the mobile anchor of the user, according to an embodiment.

When the mobile anchor 1610 is on the right side of the robot 100 as shown in FIG. 21, a signal intensity of the NLoS received by the first UWB receiver 121 may be −20 dB. When the mobile anchor 1610 is on the right side of the robot 100, a signal intensity of the NLoS received by the second UWB receiver 122 may be −10 dB. When the mobile anchor 1610 is on the right side of the robot 100, a signal intensity of the NLoS received by the third UWB receiver 123 may be −3 dB.

The main processor 160 of the robot 100 may detect a direction from the robot 100 to the mobile anchor 1610, based on a difference between radiation patterns of the NLoSs respectively received by the plurality of UWB receivers 121, 122, and 123. The plurality of UWB receivers 121, 122, and 123 may receive NLoSs. The plurality of UWB receivers 121, 122, and 123 may detect the direction from the robot 100 to the mobile anchor 1610, based on the signal intensitys of the received NLoSs. Because the plurality of UWB receivers 121, 122, and 123 have directional radiation patterns, the plurality of UWB receivers 121, 122, and 123 may detect the direction from the robot 100 to the mobile anchor 1610 by comparing the signal intensitys of the NLoSs respectively received by the plurality of UWB receivers 121, 122, and 123. The robot 100 may follow the user carrying the mobile anchor 1610, by detecting the direction from the robot 100 to the mobile anchor 1610.

The disclosure provides a technology of obtaining map information of the surroundings of a robot by applying UWB communication technology without a separate device for obtaining the map information of the surroundings of the robot.

According to an embodiment, a robot for obtaining map information by using ultra-wide band (UWB) communication may include an UWB transceiver, a plurality of UWB receivers, a memory, and a main processor. The main processor may control the UWB transceiver to transmit a UWB signal, control each of the plurality of UWB receivers to generate a plurality of channel impulse responses (CIRs), based on the UWB signal, and obtain map information of the surroundings of the robot, based on respective characteristics of the plurality of channel impulse responses.

According to an embodiment, the memory may receive channel impulse response data based on each of the plurality of channel impulse responses from the main processor, and transmit pre-stored channel impulse response data to the main processor.

According to an embodiment, the respective characteristics of the plurality of channel impulse responses may include surrounding environment information derived from a line of sight (LoS) and a non-line of sight (NLoS).

According to an embodiment, the UWB transceiver may periodically transmit a blink signal to transmit the UWB signal.

According to an embodiment, the main processor may determine that a wall exists in a first direction when a signal intensity and a signal period of a reflected wave of a first channel impulse response generated by a first UWB receiver directed in the first direction among the plurality of UWB receivers remain constant.

According to an embodiment, the main processor may determine that an obstacle exists in a second direction when at least one of a signal intensity or a signal period of a reflected wave of a second channel impulse response generated by a second UWB receiver directed in the second direction among the plurality of UWB receivers varies.

According to an embodiment, the main processor may control the UWB transceiver to transmit and receive location tracking data to and from a plurality of anchors, and control the UWB transceiver and the plurality of UWB receivers to generate and transmit location information and sensor information, based on the locating data.

According to an embodiment, the UWB transceiver may receive packet signals from the plurality of anchors, and transmit messages to the plurality of anchors in response to the packet signals.

According to an embodiment, the main processor may control the UWB transceiver to periodically transmit a line of sight (LoS) toward a mobile anchor, control the plurality of UWB receivers to receive non-lines of sight (NLoSs) from the mobile anchor, and follow the mobile anchor, based on the NLoS.

According to an embodiment, the main processor may detect a direction from the robot to the mobile anchor, based on a difference between respective radiation patterns of the NLoSs respectively received by the plurality of UWB receivers.

According to an embodiment, a method of controlling a robot for obtaining map information by using UWB communication includes transmitting a UWB signal, wherein the transmitting is performed by a UWB transceiver, generating a plurality of channel impulse responses, based on the UWB signal, wherein the generating is performed by the plurality of UWB receivers, and obtaining map information of the surroundings of the robot, based on respective characteristics of the plurality of channel impulse responses.

The obtaining of the map information of the surroundings of the robot may include storing channel impulse response data based on each of the plurality of channel impulse responses from in a memory, and transmitting pre-stored channel impulse response data to a main processor.

According to an embodiment, the respective characteristics of the plurality of channel impulse responses may include surrounding environment information derived from a line of sight (LoS) and a non-line of sight (NLoS).

According to an embodiment, the transmitting of the UWB signal may include periodically transmitting a blink signal.

According to an embodiment, the obtaining of the map information of the surroundings of the robot may include determining that a wall exists in a first direction when a signal intensity and a signal period of a reflected wave of a first channel impulse response generated by a first UWB receiver directed in the first direction among the plurality of UWB receivers remain constant.

According to an embodiment, the obtaining of the map information of the surroundings of the robot may include determining that an obstacle exists in a second direction when at least one of a signal intensity or a signal period of a reflected wave of a second channel impulse response generated by a second UWB receiver directed in the second direction among the plurality of UWB receivers varies.

According to an embodiment, the obtaining of the map information of the surroundings of the robot may include transmitting and receiving location tracking data to and from a plurality of anchors, and obtaining location information and sensor information, based on the locating data.

According to an embodiment, the transmitting and receiving of the locating data to and from the plurality of anchors may include receiving packet signals from the plurality of anchors, wherein the receiving is performed by the UWB transceiver, and transmitting messages to the plurality of anchors in response to the packet signals, wherein the transmitting is performed by the UWB transceiver.

According to an embodiment, the obtaining of the map information of the surroundings of the robot may include periodically transmitting a line of sight (LoS) toward a mobile anchor, receiving a non-line of sight (NLoS) from the mobile anchor, and following the mobile anchor, based on the NLoS.

According to an embodiment, the following of the mobile anchor, based on the NLoS, may include detecting a direction from the robot to the mobile anchor, based on a difference between respective radiation patterns of the NLoSs respectively received by the plurality of UWB receivers.

A robot and a method of controlling the robot, according to an embodiment, may obtain map information of the surroundings of the robot by applying UWB communication technology, thereby reducing the manufacturing costs of the robot.

A method according to an embodiment of the disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments or may be well-known to and be usable by one of ordinary skill in the art of computer software. Examples of a computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are high-level language codes that can be executed by a computer by using an interpreter or the like as well as machine language codes made by a compiler.

An embodiment of the disclosure may also be implemented in the form of a recording medium including instructions executable by a computer, such as a program module executed by a computer. Computer-readable media may be any available media accessible by a computer and includes both volatile and nonvolatile media and removable and non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal, or other transmission mechanism, and includes any information transmission medium. An embodiment of the disclosure may be implemented as a computer program or a computer program product including instructions executable by a computer.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which is a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A robot configured to obtain map information by using ultra-wide band (UWB) communication, the robot comprising:

an UWB transceiver;

a plurality of UWB receivers;

at least one processor; and memory storing instructions, when executed by the at least one processor individually or collectively, that cause the robot to:

control the UWB transceiver to transmit a UWB signal;

control each of the plurality of UWB receivers to generate a plurality of channel impulse responses, based on the UWB signal; and obtain map information of surroundings of the robot, based on respective characteristics of the plurality of channel impulse responses.

2. The robot of claim 1, wherein the map information is obtained based on the respective characteristics of the plurality of channel impulse responses and pre-stored channel impulse response data.

3. The robot of claim 1, wherein the respective characteristics of the plurality of channel impulse responses comprise surrounding environment information based on a line of sight signal from the UWB transceiver and a non-line of sight signal from the surroundings.

4. The robot of claim 1, wherein to transmit the UWB signal comprises to periodically transmit a blink signal.

5. The robot of claim 1, wherein the instructions, when executed by the at least one processor individually or collectively, that cause the robot to:

determine that a wall exists in a first direction when a signal intensity and a signal period of a reflected wave of a first channel impulse response generated by a first UWB receiver directed in the first direction among the plurality of UWB receivers remain constant.

6. The robot of claim 1, wherein the instructions, when executed by the at least one processor individually or collectively, that cause the robot to:

determine that an obstacle exists in a second direction when at least one of a signal intensity or a signal period of a reflected wave of a second channel impulse response generated by a second UWB receiver directed in the second direction among the plurality of UWB receivers varies.

7. The robot of claim 1, wherein the instructions, when executed by the at least one processor individually or collectively, that cause the robot to:

control the UWB transceiver to transmit and receive location tracking data to and from a plurality of anchors; and control the UWB transceiver and the plurality of UWB receivers to generate and transmit location information and sensor information, based on the location tracking data.

8. The robot of claim 7, wherein the UWB transceiver is further configured to receive packet signals from the plurality of anchors and transmit messages to the plurality of anchors in response to the packet signals.

9. The robot of claim 1, wherein the instructions, when executed by the at least one processor individually or collectively, that cause the robot to:

control the UWB transceiver to periodically transmit a line of sight (LoS) signal toward a mobile anchor;

control the plurality of UWB receivers to receive non-lines of sight (NLoSs) signals from the mobile anchor; and follow the mobile anchor, based on the NLoS.

10. The robot of claim 9, wherein the instructions, when executed by the at least one processor individually or collectively, that cause the robot to:

detect a direction from the robot to the mobile anchor, based on a difference between respective radiation patterns of the NLoSs signals respectively received by the plurality of UWB receivers.

11. A controlling method of a robot configured to obtain map information by using ultra-wide band (UWB) communication, the controlling method comprising:

transmitting, by a UWB transceiver of the robot, a UWB signal;

generating, based on the UWB signal by a plurality of UWB receivers of the robot, a plurality of channel impulse responses; and obtaining map information of surroundings of the robot, based on respective characteristics of the plurality of channel impulse responses.

12. The controlling method of claim 11, wherein the map information is obtained based on the respective characteristics of the plurality of channel impulse responses and pre-stored channel impulse response data.

13. The controlling method of claim 11, wherein the respective characteristics of the plurality of channel impulse responses comprises surrounding environment information based on a line of sight signal from the UWB transceiver and a non-line of sight signal from the surroundings.

14. The controlling method of claim 11, wherein the transmitting of the UWB signal comprises periodically transmitting a blink signal.

15. The controlling method of claim 11, wherein the obtaining of the map information of the surroundings of the robot comprises determining that a wall exists in a first direction when a signal intensity and a signal period of a reflected wave of a first channel impulse response generated by a first UWB receiver directed in the first direction among the plurality of UWB receivers remain constant.

16. The controlling method of claim 11, wherein the obtaining of the map information of the surroundings of the robot comprises determining that an obstacle exists in a second direction when at least one of a signal intensity or a signal period of a reflected wave of a second channel impulse response generated by a second UWB receiver directed in the second direction among the plurality of UWB receivers varies.

17. The controlling method of claim 11, wherein the obtaining of the map information of the surroundings of the robot comprises:

transmitting and receiving location tracking data to and from a plurality of anchors; and obtaining location information and sensor information, based on the location tracking data.

18. The controlling method of claim 17, wherein the transmitting and receiving of the location tracking data to and from the plurality of anchors comprises:

receiving, by the UWB transceiver, packet signals from the plurality of anchors; and transmitting, by the UWB transceiver, messages to the plurality of anchors in response to the packet signals.

19. The controlling method of claim 11, wherein the obtaining of the map information of the surroundings of the robot comprises:

periodically transmitting a line of sight (LoS) signal toward a mobile anchor;

receiving a non-line of sight (NLOS) signals from the mobile anchor; and following the mobile anchor, based on the NLoS.

20. The controlling method of claim 19, wherein the following of the mobile anchor, based on the NLOS signals, comprises detecting a direction from the robot to the mobile anchor, based on a difference between respective radiation patterns of the NLoSs signals respectively received by the plurality of UWB receivers.

* * * * *